(12) United States Patent
Hanazawa

(10) Patent No.: US 6,708,151 B1
(45) Date of Patent: Mar. 16, 2004

(54) REFERENCE PATTERN GENERATING APPARATUS AND METHOD, AND COMPUTER READABLE MEDIUM HAVING REFERENCE PATTERN GENERATING PROGRAM EMBODIED THEREON

(75) Inventor: Toshiyuki Hanazawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 369 days.

(21) Appl. No.: 09/660,478

(22) Filed: Sep. 12, 2000

(30) Foreign Application Priority Data

Sep. 13, 1999 (JP) ............................................ 11-259421

(51) Int. Cl.⁷ ............................................. G01L 15/06
(52) U.S. Cl. ..................................................... 704/244
(58) Field of Search ................................ 704/243, 244, 704/254

(56) References Cited

U.S. PATENT DOCUMENTS

| | | | | |
|---|---|---|---|---|
| 4,797,929 A | * | 1/1989 | Gerson et al. ............... | 704/243 |
| 4,837,831 A | * | 6/1989 | Gillick et al. ............... | 704/245 |
| 5,202,952 A | * | 4/1993 | Gillick et al. ............... | 704/200 |
| 5,526,463 A | * | 6/1996 | Gillick et al. ............... | 704/251 |
| 5,822,730 A | * | 10/1998 | Roth et al. .................. | 704/255 |
| 6,240,389 B1 | * | 5/2001 | Keiller et al. ............... | 704/243 |

FOREIGN PATENT DOCUMENTS

JP        A6444997        5/1989

* cited by examiner

*Primary Examiner*—Susan McFadden
(74) *Attorney, Agent, or Firm*—Birch, Stewart, Kolasch & Birch, LLP

(57) ABSTRACT

A reference pattern generating apparatus comprises an initial reference pattern generating unit for dividing a time series of feature vectors obtained from a voice signal into a sequence of small sections in such a manner that any two adjacent small sections overlap each other, and for averaging part of the time series of feature vectors included in each of the plurality of small sections so as to generate an initial reference pattern having a plurality of states respectively associated with the plurality of small sections. A reference pattern generating unit brings each of the plurality of states of the initial reference pattern into correspondence with part of the time series of feature vectors using pattern matching, and then averages the part of the time series of feature vectors brought into correspondence with each of the plurality of states of the initial reference pattern so as to update the initial reference pattern to generate a reference pattern.

15 Claims, 16 Drawing Sheets

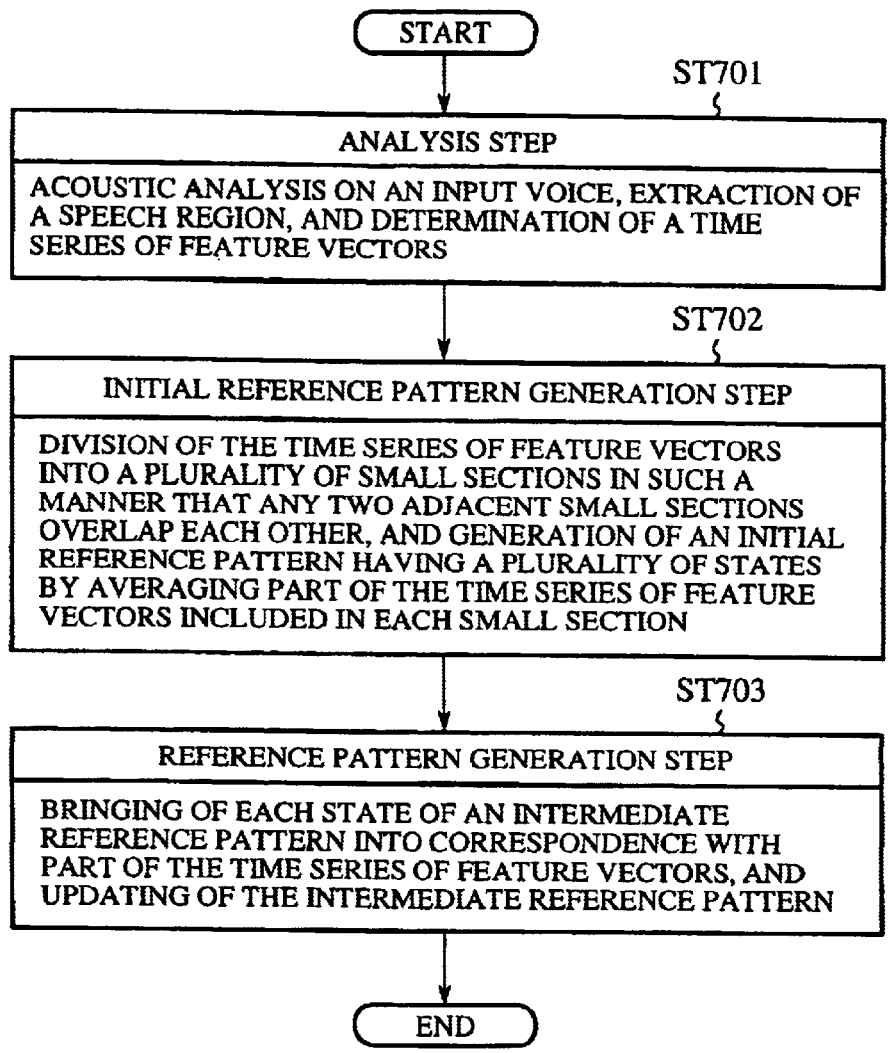
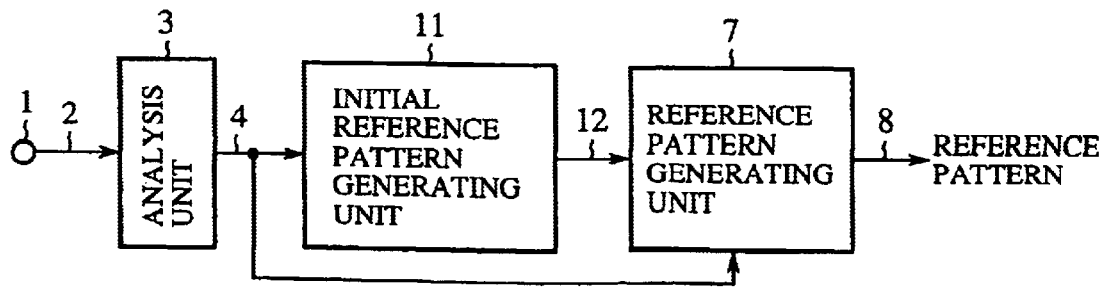

REFERENCE PATTERN GENERATING APPARATUS AND METHOD, AND COMPUTER READABLE MEDIUM HAVING REFERENCE PATTERN GENERATING PROGRAM EMBODIED THEREON

BACKGROUND OF THE INVENTION

1. Field of the Invention

The present invention relates to a reference pattern generating apparatus and method for generating a reference pattern having a high representation efficiency for use in speech recognition. The invention relates to a computer readable medium having a reference pattern generating program embodied thereon that may be used to implement the method.

2. Description of the Prior Art

In general, speech recognition employs a pattern matching method of comparing an input voice pattern with a set of reference patterns associated with words by computing pattern matching distances between the input voice pattern and the reference patterns, and furnishing a word exhibiting a minimum pattern matching distance as the recognition result. A word's reference pattern can be a time series of frames or feature vectors $X(1), X(2), X(3), \ldots, X(T)$ obtained from an input voice pattern of the word, where T is the length of the word (i.e. the number of frames). Since T depends on words, the size of the reference pattern depends on words. Therefore, the size of memory used for storing a set of reference patterns cannot be determined in advance, even if the number of words is predetermined. In addition, as the number of frames T assigned to each word increases, the amount of storage used for storing the set of reference patterns also increases.

In order to solve such problems, an apparatus for and method of compressing the time series of feature vectors $X(1), X(2), X(3), \ldots, X(T)$ obtained from an input voice pattern of each word and generating a predetermined number $J(>1)$ of states of reference pattern for each word, J being independent of the number of frames of each word, have been studied.

Referring now to FIG. 17, there is illustrated a block diagram showing the structure of such a prior art reference pattern generating apparatus as disclosed in Japanese Patent Application Publication (TOKKAISHO) No. 64-44997, for example. In the figure, reference numeral 1 denotes an input terminal for receiving a voice signal 2, applied thereto, numeral 3 denotes an analysis unit for performing an acoustic analysis on the input voice signal 2, numeral 4 denotes a time series of feature vectors, which is obtained as an acoustic analysis result from the input voice signal 2 by the analysis unit 3, numeral 5 denotes an initial reference pattern generating unit for generating an initial reference pattern 6 from the time series 4 of feature vectors, and numeral 7 denotes a reference pattern generating unit for generating a reference pattern 8 from the initial reference pattern 6.

In operation, a voice signal generated from a person's voice is applied to the input terminal 1 to create a reference pattern. The analysis unit 3 analog-to-digital converts the voice signal 2 applied to the input terminal and then performs an acoustic analysis on the analog-to-digital converted voice signal on a per-frame basis (a certain short time interval is called a "frame"). Based on the acoustic analysis result, the analysis unit 3 extracts a speech region (region in which speech is present) from the digital voice signal and then calculates a time series 4 of feature vectors $X(1), X(2), X(3), \ldots, X(T)$ from the speech region. Each feature vector $X(t)$ $(t=1, 2, 3, \ldots T)$ is calculated on a per-frame basis. T is the number of frames included in the speech region extracted from the digital voice signal, i.e. the number of feature vectors. Since it is difficult to precisely extract the speech region (where voice is present) from the digital voice signal, a few leading and last frames can include a pause. Each feature vector $X(t)$ can be an LPC cepstrum obtained with linear prediction or LPC analysis.

The initial reference pattern generating unit 5 receives the time series 4 of feature vectors $X(1), X(2), X(3), \ldots, X(T)$ from the analysis unit 3, and then generates an initial value 6 of the reference pattern following a procedure, which will be mentioned later. Referring next to FIG. 18, there is illustrated a flow diagram showing the procedure of generating the initial reference pattern 6.

The initial reference pattern generating unit 5, in step ST101 of FIG. 18, divides the time series 4 of feature vectors $X(1), X(2), X(3), \ldots, X(T)$ into J (J>1) small sections $B(1), B(2), B(3), \ldots, B(J)$ in such a manner that any two adjacent small sections do not overlap each other and they are equal in length where possible. Start and end frames $sz(j)$ and $ez(j)$ of each small section $B(j)$ $(j=1, 2, 3, \ldots, J)$ are given by the following equations (1) to (3):

$$L = [T/J] \tag{1}$$

$$sz(j) = \begin{cases} 1 & \text{for } j = 1 \\ ez(j-1)+1 & \text{for } j = 2, \ldots, J \end{cases} \tag{2}$$

$$ez(j) = \begin{cases} sz(j)+L-1 & \text{for } j = 1, \ldots, J-1 \\ T & \text{for } j = J \end{cases} \tag{3}$$

where [ ] of the equation (1) is an arithmetic operation to round off the number in the square brackets to produce an integer.

FIG. 19 shows an example in which the number T of frames or feature vectors $X(1), X(2), X(3), \ldots, X(T)$ is 15, and the number J of small sections $B(1), B(2), B(3), \ldots, B(J)$ or states of the reference pattern is 5. In this example, the time series 4 of feature vectors $X(1), X(2), X(3), \ldots, X(15)$ is divided into the plurality of small sections $B(1), B(2), B(3), \ldots, B(J)$ in such a manner that they are equal in length and $B(1)$ includes feature vectors $X(1)$ to $X(3)$, $B(2)$ includes feature vectors $X(4)$ to $X(6), \ldots$, and $B(5)$ includes feature vectors $X(13)$ to $X(15)$.

The initial reference pattern generating unit 5 then advances to step ST102 in which it averages part of the time series 4 of feature vectors included in each small section $B(j)$ obtained in step ST101 according to the following equation (4) to generate an initial value $Rz(j)$ $(j=1, 2, 3, \ldots, J)$:

$$Rz(j) = \frac{1}{ez(j)-sz(j)+1} \sum_{k=sz(j)}^{ez(j)} X(k) \tag{4}$$

The process of generating the initial value $Rz(j)$ $(j=1, 2, 3, \ldots, J)$ for each small section in the case of the number J of states of the reference pattern=5 is shown in FIG. 19. The initial value $Rz(1)$ for the first state is produced by averaging the time series of the leading three feature vectors $X(1)$ to $X(3)$ included in the first small section $B(1)$, the initial value $Rz(2)$ for the second state is produced by averaging the time series of the three feature, vectors $X(4)$ to $X(6)$ included in the second small section $B(2), \ldots$, and the initial value $Rz(5)$ for the fifth state is produced by averaging the time series of the last three feature vectors X(13) to X(15) included in the fifth small section B(5), as shown in FIG. 19.

During the above-mentioned averaging process, the initial value Rz(j) for each small section is determined in such a manner that the sum D(j) of Euclidean distances between each state of the initial reference pattern Rz(j) and the feature vectors X(sz(j)) to X(ez(j)) included in each small section B(j), which is calculated according to the following equation (5), is minimized.

$$D(j) = \sum_{k=sz(j)}^{ez(j)} |Rz(j) - X(k)|^2 \qquad (5)$$

In this way, the initial reference pattern generating unit 5 completes the process of generating the initial reference pattern 6.

The reference pattern generating unit 7 receives the initial reference pattern 6 including the plurality of states Rz(1), Rz(2), Rz(3), ..., Rz(J) generated by the initial reference pattern generating unit 5 and the time series 4 of feature vectors X(1), X(2), X(3), ..., X(T), which are calculated from the input voice signal by the analysis unit 3. The reference pattern generating unit 7 then generates a reference pattern having a plurality of states each of which is designated by R(j)) (j=1, 2, 3, ..., J) following a procedure which will be explained later.

Referring next to FIG. 20, there is illustrated a flow diagram showing the procedure of generating each state of the reference pattern R(j). The reference pattern generating unit 7, in step ST201 of FIG. 20, sets the value c of a learning number counter (not shown) thereof at zero. The reference pattern generating unit 7 then advances to step ST202 in which it copies each state of the initial reference pattern Rz(j) (j=1, 2, 3, ..., J) generated by the initial reference pattern generating unit 5 into a corresponding state of an intermediate reference pattern R(c)(j) (j=1, 2, 3, ..., J) according to the following equation (6):

$$R(c)(j) = Rz(j) \text{ where } j=1, 2, 3, \ldots, J \qquad (6)$$

where c in the (c) is the value of the learning number counter (not shown).

After that, the reference pattern generating unit 7, in step ST203, brings each state of the intermediate reference pattern R(c)(j) (j=1, 2, 3. ..., J) into correspondence with part of the time series 4 of feature vectors X(1), X(2), X(3), ..., X(T). The correspondence process can be carried out using a Viterbi algorithm in such a manner that a pattern matching distance D described below is minimized. The algorithm can be implemented by performing an initial setting according to following equations (7) and (8), and repeating an arithmetic operation using the recurrence formulas given by the following equations (9) and (10), and the pattern matching distance D is given by the following equation (11):

$$G(t, 0) = \infty, t = 0 \sim T \qquad (7)$$

$$G(1, 1) = |X(1) - Rz(1)|^2 \qquad (8)$$

$$G(t, j) = |X(t) - Rz(j)|^2 + \min\{G(t-1, j), G(t-1, j-1)\} \qquad (9)$$

$$BTK(t, j) = \begin{cases} 1 & \text{for } G(t-1, j), \leq G(t-1, j-1) \\ 0 & \text{for } G(t-1, j), > G(t-1, j-1) \end{cases} \qquad (10)$$

-continued $$D = G(T, J) \qquad (11)$$

where G(t,j) is a summed Viterbi distance, BTK (t,j) is back track information, D is the pattern matching distance between the time series of feature vectors X(1), X(2), X(3), ..., X(T) and the plurality of states of the intermediate reference pattern R(c) (1), R(c) (2), ..., R(c)(J), and min {.,.} is an operator for selecting a minimum one from two numbers in the brackets.

After the arithmetic operation using the recurrence formulas given by the equations (9) and (10) is complete, the reference pattern generating unit 7 can obtain a correspondence between each state of the intermediate reference pattern R(c) (j)(j=1, 2, 3, ..., J) and part of the time series 4 of feature vectors X(1), X(2), X(3), ..., X(T) extracted from the input voice signal, which minimizes the pattern matching distance D given by the above equation (11), by tracing the back track information BTK (t,j) all the way from the frame T in the reverse direction with respect to time. The correspondence will be referred to as Viterbi path hereinafter. The reference pattern generating unit 7 then, in step ST203, determines start and end frames s'(j) and e'(j) for each of J new small sections B'(j) (j=1, 2, 3, ..., J) from the Viterbi path.

The reference pattern generating unit 7 advances to step ST204 in which it averages part of the time series 4 of feature vectors included in each new small section B'(j) obtained in step ST203 to produce an updated state of intermediate reference pattern R(c+1) (j) (j=1, 2, 3, ..., J) according to the following equation (12):

$$R(c+1)(j) = \frac{1}{e'(j) - s'(j) + 1} \sum_{k=s'(j)}^{e'(j)} X(k) \qquad (12)$$

The reference pattern generating unit 7 then, in step ST205, increments the value c of the learning number counter (not shown) by 1, and, in step ST206, determines whether the value c reaches a predetermined threshold value CC. If the value c of the learning number,counter (not shown) reaches the predetermined threshold value CC, the reference pattern generating unit 7 branches to step ST207 in which it furnishes the time sequence of states of the updated intermediate reference pattern R(c)(1), R(c)(2), R(c)(3), ..., R(c)(J) as the reference pattern and stops the reference pattern generating procedure. In contrast, unless the value c of the learning number counter (not shown) reaches the predetermined threshold value CC, the reference pattern generating unit 7 reverts back to step ST203 in which it repeats the above-mentioned reference pattern generating procedure. By repeating the above-mentioned reference pattern generating procedure, the pattern matching distance D can converge to a local minimum value. The fact that the pattern matching distance D is small means that the amount of information losses due to compression is reduced and the obtained reference pattern has high representation efficiency.

As previously mentioned, the prior art reference pattern generating apparatus determines feature vectors included in each small section B(j) (j=1, 2, 3, ..., J) and an initial value Rz(j) in such a manner that the sum D(j) of Euclidean distances between each state of the initial reference pattern Rz(j) and the time series of feature vectors X(sz(j)) to X (ez(j)) included in each small section B(j) is minimized. Accordingly, a problem is that even when the reference pattern generating unit 7 copies each state of the initial reference pattern Rz(j) into a corresponding state of the intermediate reference pattern R(c)(j) and then brings each state of the intermediate reference pattern R(c)(j) into correspondence with part of the time series 4 of feature vectors X(1), X(2), X(3), . . . , X(T) in such a manner that the pattern matching distance D is minimized, the same part of the time series 4 of feature vectors as that assigned to each previous small section B(j) (j=1, 2, 3, . . . , J) can often belong to a corresponding one of a plurality of the new small sections B'(j) (j=1, 2, 3, . . . , J) again, and therefore the reference pattern can often be trapped in the initial reference pattern and the reference pattern can converge to an undesired local minimum value.

The present invention will become more fully understood from the detailed description given hereinbelow and the accompanying drawings, which are given by way of illustration only, and thus are not limitative of the present invention, and wherein:

BRIEF DESCRIPTION OF THE DRAWINGS

FIG. 6 is a flow diagram showing a reference pattern generating method according to the first embodiment of the present invention;

FIG. 7 is a block diagram showing the structure of a reference pattern generating apparatus according to a second embodiment of the present invention;

DETAILED DESCRIPTION OF THE PREFERRED EMBODIMENTS

Embodiment 1

Figure 1:
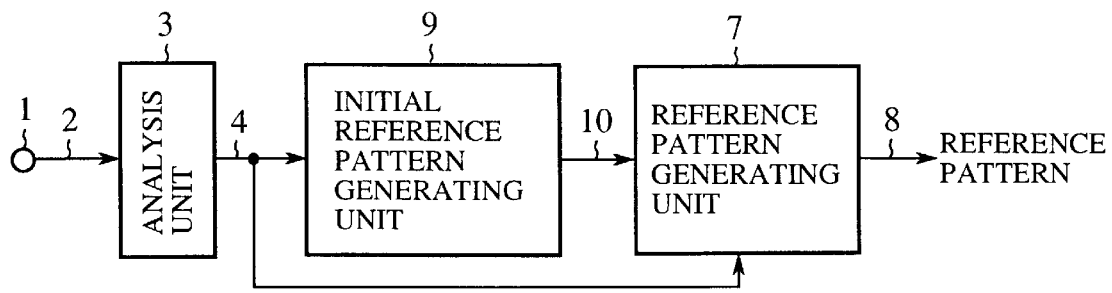
FIG. 1 is a block diagram showing the structure of a reference pattern generating apparatus according to a first embodiment of the present invention.

Referring next to FIG. 1, there is illustrated a block diagram showing the structure of a reference pattern generating apparatus according to a first embodiment of the present invention. In the figure, reference numeral 1 denotes an input terminal for receiving a voice signal 2 applied thereto, numeral 3 denotes an analysis unit for performing an acoustic analysis on the input voice signal 2, numeral 4 denotes a time series of feature vectors, which is obtained as an acoustic analysis result from the input voice signal 2 by the analysis unit 3, numeral 9 denotes an initial reference pattern generating unit for dividing the time series 4 of feature vectors into a plurality of small sections in such a manner that they are equal in length and any two adjacent small sections overlap each other, and for averaging a time series of feature vectors included in each of the plurality of small sections to generate an initial reference pattern 10 having a plurality of states, numeral 7 denotes a reference pattern generating unit for bringing each state of the initial reference pattern 10 into correspondence with part of the time series 4 of feature vectors output from the analysis unit 3 using a pattern matching method and for averaging the part of the time series 4 associated with each state of the initial reference pattern to update the initial reference pattern, so as to generate a reference pattern 8.

In operation, a voice signal generated from a person's voice is applied to the input terminal 1 to create a reference pattern. The analysis unit 3 analog-to-digital converts the voice signal 2 applied to the input terminal 1 and then performs an acoustic analysis on the analog-to-digital converted voice signal on a per-frame basis (a certain short time interval is called a "frame"). Based on the acoustic analysis result, the analysis unit 3 extracts the region including speech from the digital voice signal and then calculates a time series 4 of feature vectors X(1), X(2), X(3), . . . , X(T) associated therewith. Each feature vector X(t) (t=1, 2, 3, . . . , T) is produced on a per-frame basis. T is the number of frames included in the speech region extracted from the digital voice signal. Since it is difficult to precisely extract the speech region from the digital voice signal, a few leading and last frames can include a pause. Each feature vector X(t) (t=1, 2, 3, . . . , T) can be an LPC (Linear Predictive Coding) cepstrum obtained with linear prediction or LPC analysis.

Figure 2:
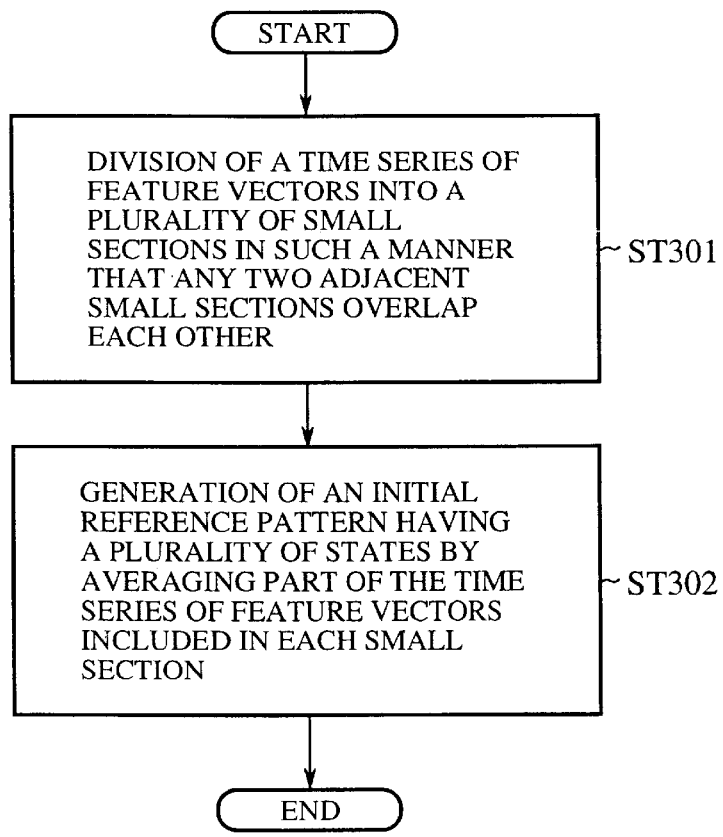
FIG. 2 is a flow diagram showing a procedure of generating an initial reference pattern performed by an initial reference pattern generating unit of the reference pattern generating apparatus of the first embodiment.
Figure 3:
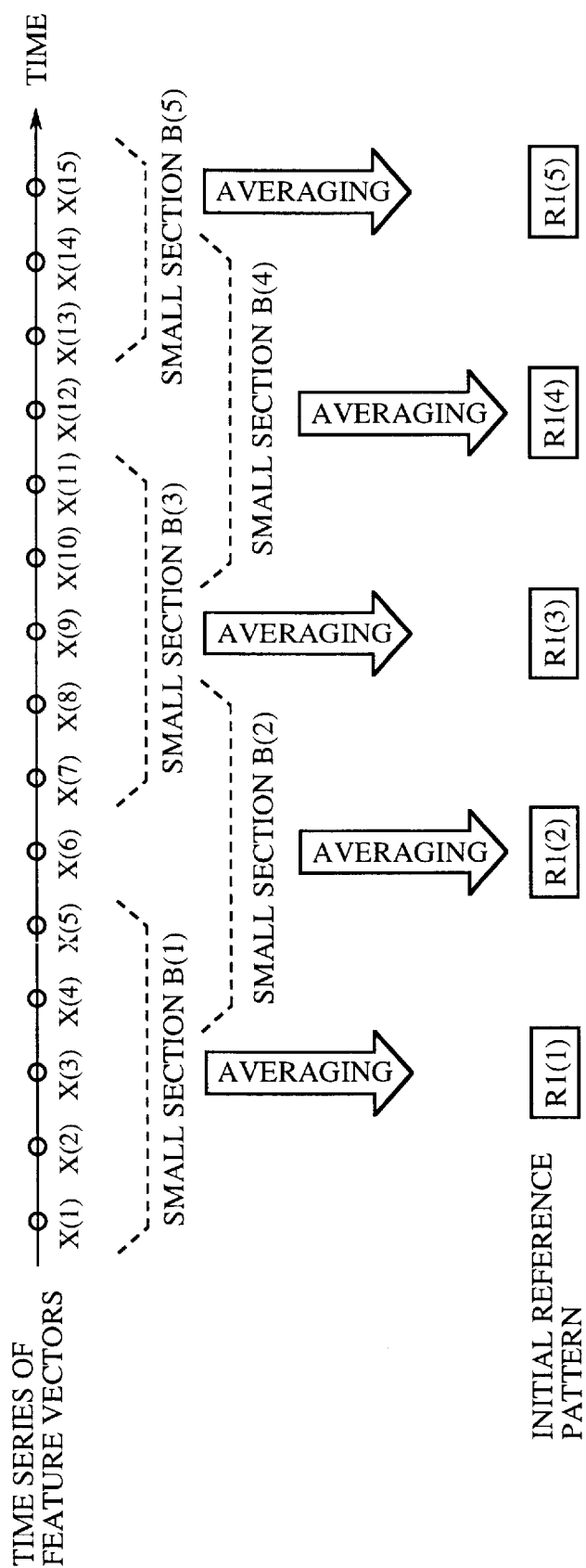
FIG. 3 is a diagram showing an example of the initial reference pattern generating procedure of FIG. 2.

The initial reference pattern generating unit 9 receives the time series 4 of feature vectors X(1), X(2), X(3), . . . , X(T), which is the acoustic analysis result obtained from the input voice signal 2, from the analysis unit 3, and then generates an initial reference pattern 10 following a procedure, which will be mentioned later. Referring next to FIG. 2, there is illustrated a flow diagram showing the procedure of generating the initial reference pattern 10. The initial reference pattern generating unit 9, in step ST301 of FIG. 2, divides the time series 4 of feature vectors X(1), X(2), X(3), ..., X(T) into J (J>1) small sections B(1), B(2), B(3), ... B(J) in such a manner that all of them are equal in length, where possible, otherwise all but B(J) are equal in length, and any two adjacent small sections overlap each other. In this case, start and end frames s(j) and e(j) of each small sections B(j) (j=1, 2, 3, ..., J) are given by the following equations (13) to (15):

$$L = [T/J] \quad (13)$$

$$s(j) = (j-1)*L + 1 \quad (14)$$

$$e(j) = \begin{cases} s(j) + L - 1 + K & \text{for } j = 1, \ldots, J-1 \\ T & \text{for } j = J \end{cases} \quad (15)$$

where [ ] of the equation (13) is an arithmetic operation to round off the number in the square brackets to generate an integer, and K of the equation (15) is an overlap parameter for controlling the number of overlapped frames included in each small section B(j). FIG. 3 shows an example in which the number T of frames or feature vectors X(1), X(2), X(3), ..., X(T) is 15, the number J of small sections B(1), B(2), B(3), ..., B(J) or states of the reference pattern is 5, and the overlapped parameter K is 2. In this example, the time series 4 of feature vectors X(1), X(2), X(3), ..., X(15) is divided to the plurality of small sections B(1), B(2), B(3), ..., B(5) any two of which overlap each other in such a manner that B(1) includes feature vectors X(1) to X(5), B(2) includes feature vectors X(4) to X(8), ..., and B(5) includes feature vectors X(13) to X(15).

The initial reference pattern generating unit 9 then advances to step ST302 in which it averages part of the time series 4 of feature vectors included in each small section B(j) obtained in step ST301 according to the following equation (16) to generate an initial value R1(j) (j=1, 2, 3, ..., J) for each small section:

$$R1(j) = \frac{1}{e(j) - s(j) + 1} \sum_{k=s(j)}^{e(j)} X(k) \quad (16)$$

The process of generating the initial value R1(j) (j=1, 2, 3, ..., J) is shown in FIG. 3. The first initial value R1(1) is produced by averaging the time series of the leading five feature vectors X(1), ..., X(5) included in the first small section B(1), the second initial value R1(2) is produced by averaging the time series of the five feature vectors X(4), ..., X(8) included in the second small section B(2), ..., and the fifth initial value R1(5) is produced by averaging the time series of the last three feature vectors X(13), ..., X(15) included in the fifth small section B(5), as shown in FIG. 3. In this way, the initial reference pattern generating unit 9 completes the process of generating the initial reference pattern 10 including the plurality of states, i.e. the plurality of initial values R1(1), R1(2), R1(3), ..., R1(J).

The reference pattern generating unit 7 receives the initial reference pattern including the plurality of initial values R1(1), R1(2), R1(3), ..., R1(J) produced by the initial reference pattern generating unit 9 and the time series 4 of feature vectors X(1), X(2), X(3), ..., X(T) transmitted from the analysis unit 3. The reference pattern generating unit 7 then generates a reference pattern including a plurality of states each of which is designated by R(j) (j=1, 2, 3, ..., J) following a procedure which will be explained later.

Figure 4:
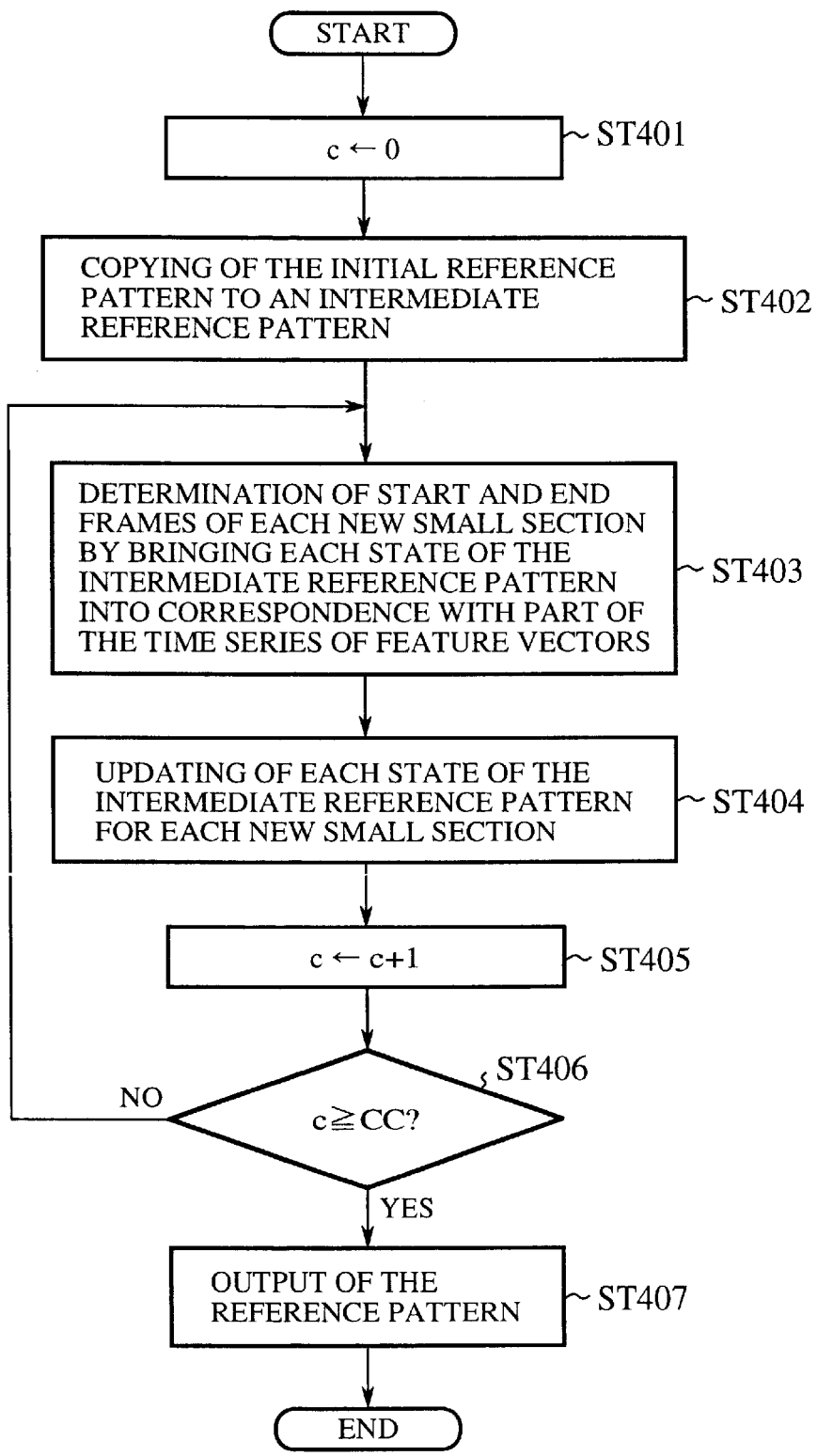
FIG. 4 is a flow diagram showing a procedure of generating a reference pattern performed by a reference pattern generating unit of the reference pattern generating apparatus of the first embodiment.

Referring next to FIG. 4, there is illustrated a flow diagram of the procedure of generating the reference pattern. The reference pattern generating unit 7, in step ST401 of FIG. 4 sets the value c of a learning number counter (not shown) thereof a t zero. The reference pattern generating unit 7 then advances to step ST402 in which bit copies each state of the initial reference pattern R1(j) (j=1, 2, 3, ..., J) generated by the initial reference pattern generating unit 9 into a corresponding a state of an intermediate reference pattern R(c)(j) (j=1, 2, 3, ..., J) according to the following equation (17):

$$R(c)(j) = R1(j) \text{ where } j=1, 2, 3, \ldots, J \quad (17)$$

where c in the (c) is the value c of the learning number counter (not shown).

After that, the reference pattern generating unit 7, in step ST403, brings each state of the intermediate reference pattern R(c)(j) (j=1, 2, 3, ..., J) into correspondence with part of the time series 4 of feature vectors X(1), X(2), X(3), ..., X(T). As in the case that a prior art reference pattern generating apparatus is used, the correspondence process can be carried out using a Viterbi algorithm in such a manner that the pattern matching distance D is minimized. The algorithm can be implemented by performing an initial setting according to the equations (7) and (8), and repeating an arithmetic operation using the recurrence formulas given by the equations (9) and (10), as previously explained.

Figure 5:
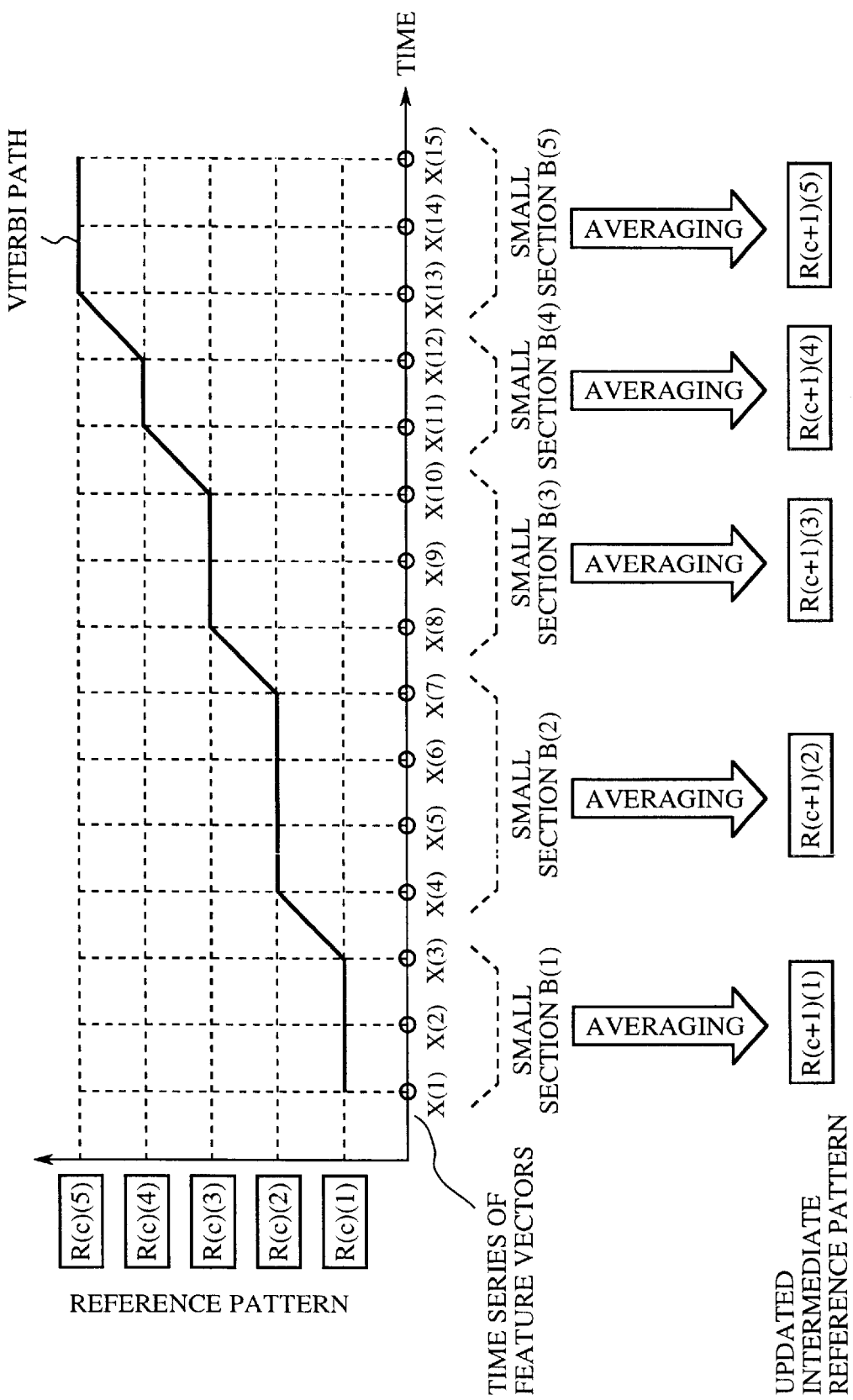
FIG. 5 is a diagram showing an example of a process of bringing each of a plurality of states of an intermediate reference pattern into correspondence with part of a time series of feature vectors, the process being included in the reference pattern generating procedure of FIG. 4.

After the arithmetic operation using the recurrence formulas given by the equations (9) and (10) is complete, the reference pattern generating unit 7 obtains a correspondence between each state of the intermediate reference pattern R(c)(j) (j=1, 2, 3, ..., J) and part of the time series 4 of feature vectors X(1), X(2), X(3), ..., X(T) obtained from the input voice signal, which minimizes the pattern matching distance D, by tracing the back track information BTK (t,j) all the way from the frame T in the reverse direction with respect to time. Referring next to FIG. 5, there is illustrated a diagram schematically showing the process of bringing each state of the intermediate reference pattern R(c)(j) into correspondence with part of the time series 4 of feature vectors X(1), X(2), X(3), ..., X(T) obtained from the input voice signal. In FIG. 5, the vertical axis shows the plurality of states of the intermediate reference pattern R(c) (1) R(c) (2) R(c) (3), ..., R(c)(J) and the horizontal axis shows the time series 4 of feature vectors X(1), X(2), X(3), ..., X(T) obtained from the input voice signal. A thick solid line of the figure is a Viterbi path. FIG. 5 shows an example in which the number T of frames or feature vectors is 15, and the number J of states of the reference pattern is 5.

The reference pattern generating unit 7 then, in step ST403, determines start and end frames s'(j) and e'(j) for each of J new small sections B'(j) (j=1, 2, 3, ..., J) from the Viterbi path of FIG. 5 in such a manner that any two adjacent new small sections don't overlap each other. The reference pattern generating unit 7 selects the leading and last frames, as the start and end frames for each new small section B'(j), from the part of the time series 4 of feature vectors X(1), X(2), X(3), ..., X(T) associated with each state of the intermediate reference pattern R(c)(j) (j=1, 2, 3, ..., J). In the example as shown in FIG. 5, R(c)(1) is brought into correspondence with the leading three feature vectors X(1) to X(3), and therefore the start frame s'(1) is 1 and the end frame et(1) is 3. Similarly, s'(2)=4 and e'(2)=7, . . . , and s'(5)=13 and e'(5)=15, because R(c)(2) is brought into correspondence with the feature vectors X(4) to X(7), . . . , and R(c)(5) is brought into correspondence with the feature vectors X(13) to X(15).

The reference pattern generating unit 7 advances to step ST404 in which it averages part of the time series 4 of feature vectors included in each new small section B'(j) obtained in step ST403 to produce an updated state of intermediate reference pattern R(c+1)(j) (j=1, 2, 3, . . . , J) according to the following equation (18):

$$R(c+1)(j) = \frac{1}{e'(j) - s'(j) + 1} \sum_{k=s'(j)}^{e'(j)} X(k) \quad (18)$$

The reference pattern generating unit 7 then, in step ST405, increments the value c of the learning number counter (not shown) by 1, and, in step ST406, determines whether the value c reaches a predetermined threshold value CC. If the value c of the learning number counter (not shown) reaches the predetermined threshold value CC, the reference pattern generating unit 7 branches to step ST407 in which it furnishes the updated intermediate reference pattern including R(c)(1), R(c)(2), R(c)(3), . . . , R(c)(J) as the reference pattern and stops the reference pattern generating procedure. In contrast, unless the value c of the learning number counter (not shown) reaches the predetermined threshold value CC, the reference pattern generating unit 7 reverts back to step ST403 in which it repeats the above-mentioned reference pattern generating procedure. By repeating the above-mentioned reference pattern generating procedure, the pattern matching distance D can converge to a local minimum value. The fact that the pattern matching distance D is small means that the amount of information losses due to compression is reduced and the obtained reference pattern has high representation efficiency.

Next, a concrete description will be made as to a method of generating a reference pattern which the above-mentioned reference pattern generating apparatus employs. FIG. 6 is a flow diagram showing a procedure for implementing the reference pattern generating method according to the first embodiment of the present invention.

When a voice signal generated from a person's voice is applied to the input terminal 1 to create a reference pattern, the analysis unit 3 starts an analyzing process of step ST701 as shown in FIG. 6. In the analyzing step, the analysis unit 3 analog-to-digital converts the voice signal 2 applied to the input terminal 1 and then performs an acoustic analysis on the analog-to-digital converted voice signal on a per-frame basis. Based on the frame-based acoustic analysis result, the analysis unit 3 extracts a speech region from the digital voice signal and then calculates a time series 4 of feature vectors X(1), X(2), X(3), . . . , X(T) each associated with each of a plurality of frames. T is the number of frames included in the speech region extracted from the digital voice signal. Since it is difficult to precisely extract the speech region from the voice signal, a few leading and last frames can include a pause. Each feature vector X(t) can be an LPC cepstrum obtained with linear prediction or LPC analysis.

Next, the reference pattern generating apparatus advances to a process of generating an initial reference pattern, as shown in step ST702 of FIG. 6. In the initial reference pattern generating step, the initial reference pattern generating unit 9 receives the time series 4 of feature vectors X(1), X(2), X(3), . . . , X(T), which is obtained in the acoustic analysis process, and then generates an initial reference pattern 10. The detailed procedure of generating the initial reference pattern is as shown in the flow diagram of FIG. 2.

The initial reference pattern generating unit 9, in step ST301 of FIG. 2, divides the time series 4 of feature vectors X(1), X(2), X(3), . . . , X(T) into J (J>1) small sections B(1), B(2), B(3), . . . , B(J) in such a manner that they are equal in length where possible, otherwise all but B(J) are equal in length, and any two adjacent small sections overlap each other, by determining start and end frames s(j) and e(j) for each small section B(j) using the equations (13) to (15). As previously explained, an example in which the number T of frames or feature vectors X(1), X(2), X(3), . . . , X(T) is 15, the number J of states of the reference pattern is 5, and the overlapped parameter K is 2 is shown in FIG. 3.

The initial reference pattern generating unit 9 then, in step ST302, averages part of the time series 4 of feature vectors included in each small section B(j) obtained in step ST301, according to the equation (16) to generate an initial value R1(j) (j=1, 2, 3, . . . , J), as shown in FIG. 3. In this way, the initial reference pattern generating unit 9 completes the process of generating the initial reference pattern 10.

The reference pattern generating apparatus then advances to a process of generating a reference pattern, as shown in step ST703 of FIG. 6. The reference pattern generating unit 7 receives the plurality of states of initial reference pattern R1(1), R1(2), R1(3), . . . , R1(J) created in the initial reference pattern generating step and the time series 4 of feature vectors X(1), X(2), X(3), . . . , X(T), which are calculated from the input voice signal by the analysis unit 3. The reference pattern generating unit 7 then generates a reference pattern including a plurality of states each of which is designated by R(j) (j=1, 2, 3, . . . , J) following a procedure which will be explained later. The detailed procedure of generating the reference pattern is shown in the flow diagram of FIG. 4.

The reference pattern generating unit 7, in step ST401 of FIG. 4, sets the value c of the learning number counter (not shown) thereof at zero. The reference pattern generating unit 7 then, in step ST402, copies each state of the initial reference pattern R1(j) (j=1, 2, 3, . . . , J) into a corresponding state of an intermediate reference pattern R(c)(j) (j=1, 2, 3, . . . , J) according to the equation (17).

After that, the reference pattern generating unit 7 brings each state of the intermediate reference pattern R(c)(j) (j=1, 2, 3, . . . , J) into correspondence with part of the time series 4 of feature vectors X(1), X(2), X(3), . . . , X(T) by using a Viterbi algorithm, for example, in such a manner that the pattern matching distance D is minimized. The Viterbi algorithm can be implemented by performing an initial setting according to the equations (7) and (8), and repeating an arithmetic operation using the recurrence formulas given by the equations (9) and (10). After the arithmetic operation using the recurrence formulas given by the equations (9) and (10) is complete, the reference pattern generating unit 7 obtains a correspondence between each state of the intermediate reference pattern R(c)(j) (j=1, 2, 3, . . . , J) and part of the time series 4 of feature vectors X(1), X(2), X(3), . . . , X(T) obtained from the input voice signal, which minimizes the pattern matching distance D, by tracing the back track information BTK (t,j) all the way from the frame T in the reverse direction with respect to time. The process of bringing each state of the intermediate reference pattern R(c)(j) into correspondence with part of the time series 4 of feature vectors X(1), X(2), X(3), . . . , X(T) obtained from the input voice signal is as shown in FIG. 5. The reference pattern generating unit 7 then, in step ST403, determines start and end frames s'(j) and e'(j) for each of J new small sections B'(j) (j=1, 2, 3, . . . , J) based on the Viterbi path of FIG. 5 in such a manner that any two adjacent new small sections don't overlap each other. The reference pattern generating unit 7 selects the leading and last frames, as the start and end frames for each new small section B'(j), from the part of the time series 4 of feature vectors X(1), X(2), X(3), . . . , X(T) associated with each state of the intermediate reference pattern R(c) (j) (j=1, 2, 3, . . . , J).

In the example as shown in FIG. 5, R(c)(1) is brought into correspondence with the leading three feature vectors X(1) to X(3), and therefore the start frame s'(1) is 1 and the end frame e'(1) is 3. Similarly, s'(2)=4 and e'(2)=7, . . . , and s'(5)=13 and e'(5)=15, because R(c)(2) is brought into correspondence with the feature vectors X(4) to X(7), . . . , and R(c)(5) is brought into correspondence with the feature vectors X(13) to X(15).

The reference pattern generating unit 7 advances to step ST404 in which it averages part of the time series 4 of feature vectors included in each new small section B'(j) obtained in step ST403 to produce an updated state of intermediate reference pattern R(c+1)(j) (j=1, 2, 3, . . . , J) according to the above-mentioned equation (18).

The reference pattern generating unit 7 then, in step ST405, increments the value c of the learning number counter (not shown) by 1, and, in step ST406, determines whether the value c reaches a predetermined threshold value CC. If the value c of the learning number counter (not shown) reaches the predetermined threshold value CC, the reference pattern generating unit 7 branches to step ST407 in which it furnishes the updated intermediate reference pattern including R(c)(1), R(c)(2), R(c)(3), . . . , R(c)(J) as the reference pattern and stops the reference pattern generating procedure. In contrast, unless the value c of the learning number counter (not shown) reaches the predetermined threshold value CC, the reference pattern generating unit 7 reverts back to step ST403 in which it repeats the above-mentioned reference pattern generating procedure.

In order to implement the reference pattern generating method via software, there is a need to provide a computer-readable storage medium for storing a program for making it possible for computers to generate a reference pattern, the program including the steps of performing an acoustic analysis on an input voice signal 2 and calculating a time series 4 of feature vectors X(1), X(2), X(3), . . . , X(T); dividing the time series 4 of feature vectors into a plurality of small sections B(1), B(2), B(3), . . . , B(J) in such a manner that any two adjacent small sections overlap each other, and averaging a time series of feature vectors included in each small section B(j) to generate each initial value R1(j) (i.e. each state of the initial reference pattern) for each small section; and bringing each of the plurality of states of the initial reference pattern: R1(j) (=R(c)(j)) into correspondence with part of the time series 4 of feature vectors X(1), X(2), . . . , X(T) using a pattern matching method and averaging the part of the time series 4 associated with each state of the intermediate reference pattern R(c)(j) to update each state of the intermediate reference pattern R(c)(j).

As previously mentioned, in accordance with the first embodiment of the present invention, the reference pattern generating apparatus divides the time series 4 of feature vectors X(1), X(2), X(3), . . . , X(T) calculated into a sequence of small sections B(1), B(2), . . . , B(J) in such a manner that any two adjacent small sections overlap each other, and then averages part of the time series 4 of feature vectors included in each small section B(j) to generate an initial value R1(j) for each small section, by means of the reference pattern generating unit 7. Therefore, the boundaries of the sequence of small sections cannot be uniquely determined during the step of generating the initial value R1(j) for each small section. When the reference pattern generating unit 7 then brings each state of an intermediate reference pattern R(c)(j) (=R1(j)) into correspondence with part of the time series 4 of feature vectors X(1), X(2), X(3), . . . , X(T) extracted from the input voice signal using the Viterbi algorithm so that the pattern matching distance D is minimized, the time series 4 of feature vectors is divided into a sequence of new small sections in such a manner that any two adjacent new small sections don't overlap each other and the boundaries of the sequence of small sections are determined uniquely. Accordingly, the first embodiment offers an advantage of decreasing a possibility that the reference pattern is trapped in its initial value and therefore the reference pattern converges to its undesirable local minimum value. In addition, when generating the initial reference pattern 10, the time series 4 of feature vectors X(1), X(2), X(3), . . . , X(T) is divided into a sequence of small sections B(1), B(2), . . . , B(J) any two of which overlap each in such a manner that all of them have equal length where possible, otherwise all but the last small section B(J) have equal length. Accordingly, the process of dividing the time series of feature vectors into the plurality of small sections can be simplified.

Embodiment 2

Referring next to FIG. 7, there is illustrated a block diagram showing the structure of a reference pattern generating apparatus according to a second embodiment of the present invention. In the figure, the same components as those of the reference pattern generating apparatus of the first embodiment are designated by the same reference numerals as shown in FIG. 1, and therefore the description of those components will be omitted hereinafter. In FIG. 7, reference numeral 11 denotes an initial reference pattern generating unit for dividing a time series 4 of feature vectors transmitted from an analysis unit 3 into a plurality of small sections while making a distinction between two pause ends and a speech-present portion included in a speech region extracted from an input digital voice signal in such a manner that any two adjacent small sections overlap each other and one small section is assigned to each of the two pause ends and remaining small sections are assigned to the speech portion, and for averaging a time series of feature vectors included in each of the plurality of small sections to generate an initial value 12 of a reference pattern.

Thus the reference pattern generating apparatus according to the second embodiment differs from that of the first embodiment in that the initial reference pattern generating unit 11 divides the time series 4 of feature vectors transmitted from the analysis unit 3 into a plurality of small sections while making a distinction between two pause ends and a speech portion included in a speech region extracted from an input digital voice signal in such a manner that any two adjacent small sections overlap each other and one small section is assigned to each of the two pause ends and remaining small sections are assigned to the speech portion.

In operation, a voice signal generated from a person's voice is applied to an input terminal 1 to create a reference pattern. The analysis unit 3 analog-to-digital converts the voice signal 2 applied to the input terminal 1 and then performs an acoustic analysis on the analog-to-digital converted voice signal on a per-frame basis (each certain short time interval is called a "frame"). Based on the acoustic analysis result, the analysis unit 3 extracts a speech region from the digital voice signal and then calculates a time series 4 of feature vectors X(1), X(2), X(3), ..., X(T) on a per-frame basis from the speech region. The analysis unit 3 also calculates a time series of powers of the voice signal within the speech region on a per-frame basis: P(1), P(2), P(3), ..., P(T), and then furnishes the time series of powers together with the time series 4 of feature vectors X(1), X(2), X(3), ..., X(T). T is the number of frames included in the speech region extracted from the digital voice signal. Since it is difficult to precisely extract the speech region from the digital voice signal, a few leading and last frames can include a pause. Each feature vector X(t) can be an LPC cepstrum obtained with linear prediction or LPC analysis.

Figure 8:
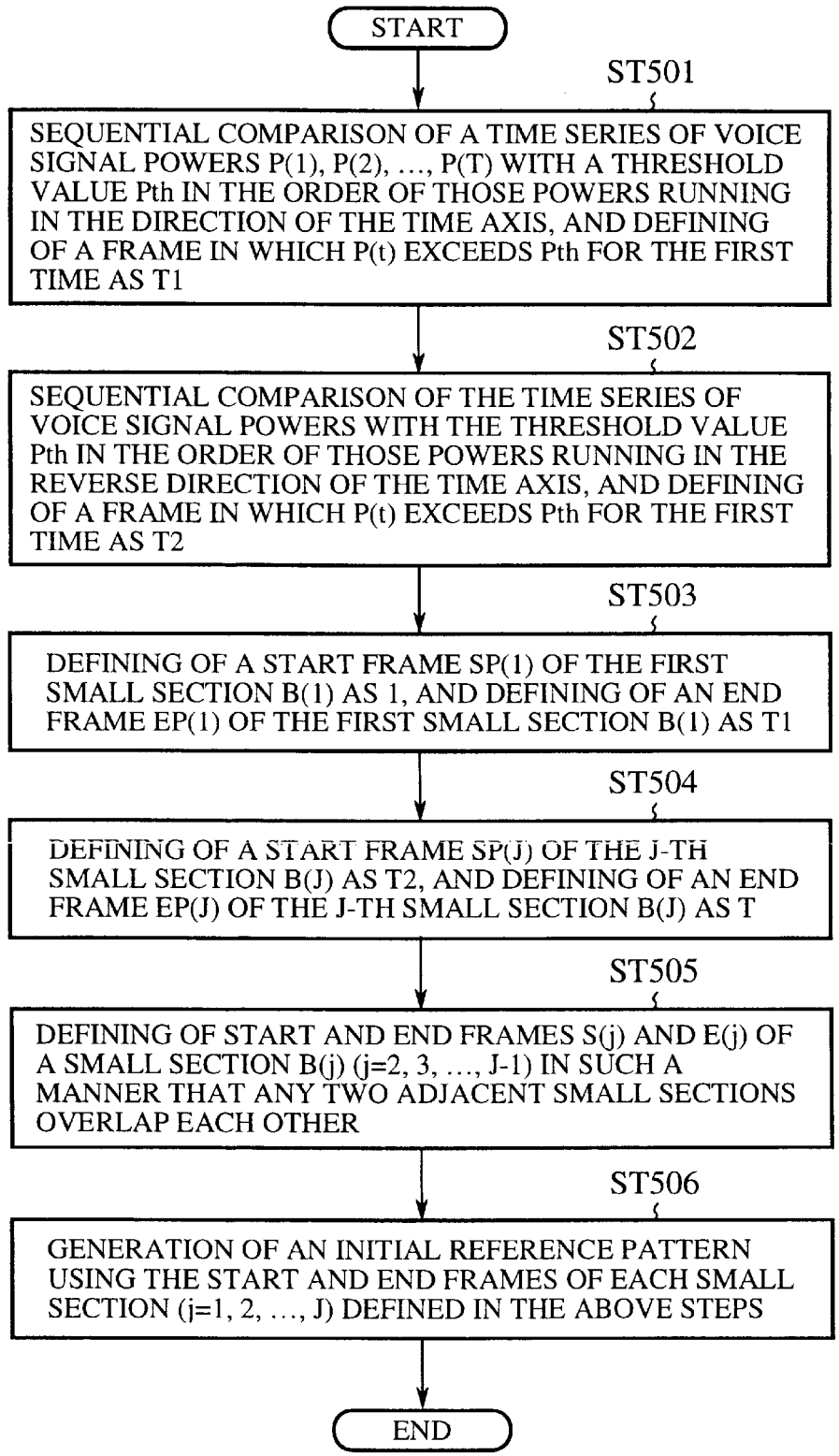
FIG. 8 is a flow diagram showing a procedure of generating an initial reference pattern performed by an initial reference pattern generating unit of the reference pattern generating apparatus of the second embodiment.
Figure 9:
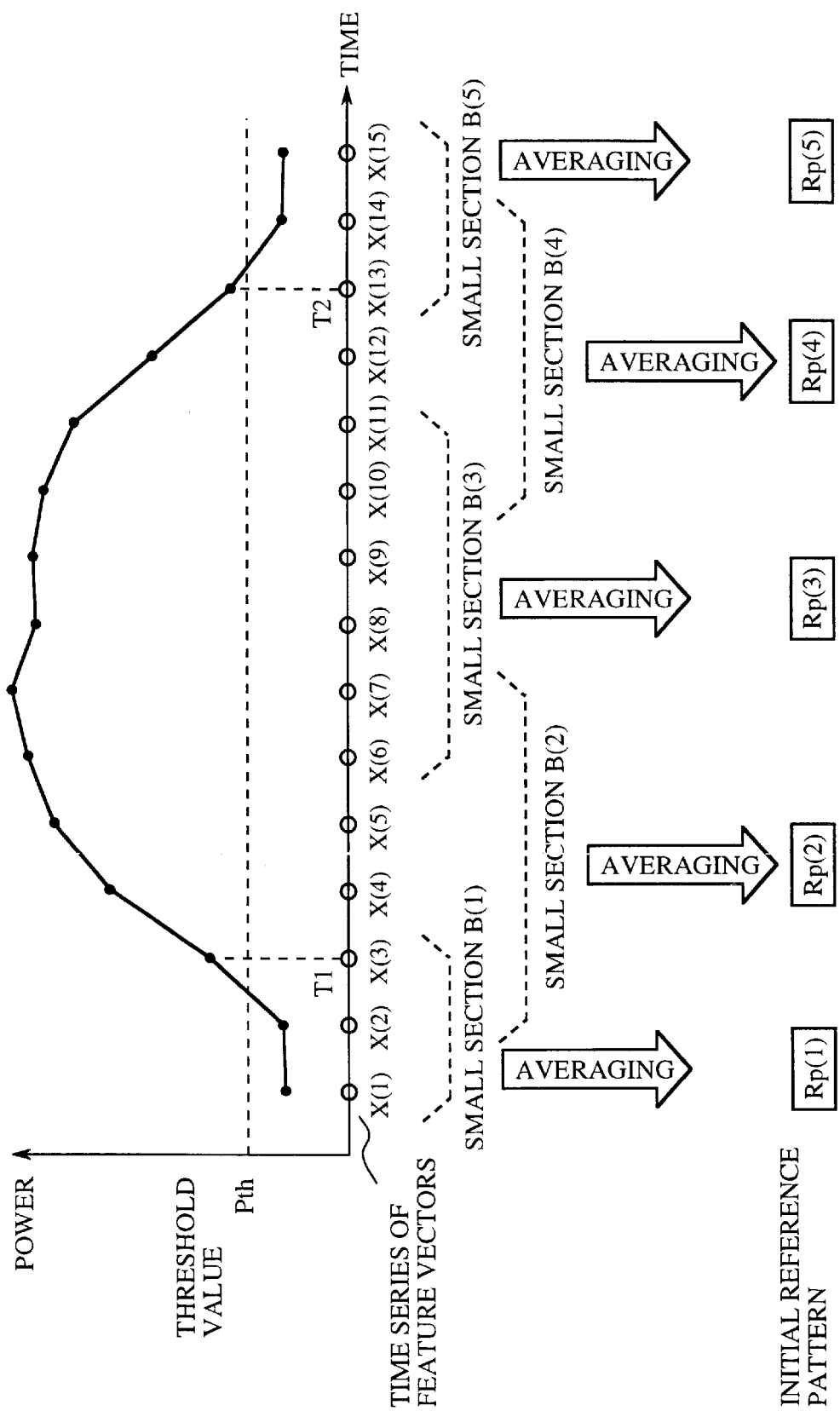
FIG. 9 is a diagram showing an example of the initial reference pattern generating procedure of FIG. 8.

The initial reference pattern generating unit 11 receives the time series 4 of feature vectors X(1), X(2), X(3), ..., X(T) from the analysis unit 3, and then generates an initial value of a reference pattern 12 following a procedure, which will be mentioned later. Referring next to FIG. 8, there is illustrated a flow diagram showing the procedure of generating the initial reference pattern 12. FIG. 9 shows an example of the initial reference pattern generating procedure. The initial reference pattern generating unit 11, in step ST501 of FIG. 8, sequentially compares the time series of powers P(1), P(2), P(3), ..., P(T) of the voice signal applied to the input terminal 1 with a predetermined threshold value Pth in the order in which those powers are running in the forward direction of the time axis, that is, in the order of t=1, 2, 3, ..., T, as shown in FIG. 9. Then the initial reference pattern generating unit 11 detects a frame T1 in which the corresponding voice signal power P(t) exceeds the threshold value Pth for the first time. In the example of FIG. 9, the voice signal power P(t) at t=3 exceeds the threshold value Pth for the first time, and hence T1=3.

Next, the initial reference pattern generating unit 11, in step ST502, sequentially compares the time series of voice signal powers P(1), P(2), P(3), ..., P(T) with the predetermined threshold value Pth in the order in which those powers are running in the reverse direction of the time axis, that is, in the order of t=T, (T−1), ..., 2, 1. Then the initial reference pattern generating unit 11 detects a frame T2 in which the corresponding voice signal power P(t) exceeds the threshold value Pth for the first time. In the example of FIG. 9, the comparison in the reverse direction of the time axis shows that the voice signal power P(t) at t=13 exceeds the threshold value Pth for the first time, and hence T2=13.

Then the initial reference pattern generating unit 11 advances to step ST503 in which in order to divide the time series 4 of feature vectors X(1), X(2), X(3), ..., X(T) into J small sections B(1), B(2), B(3), ..., B(J), it defines a start frame sp(1) of the first small section B(1) as 1, i.e. sp(1)=1, and also defines an end frame ep(1) of the small section B(1) as T1 obtained in step ST501, i.e. ep(1)=T1.

Then, the initial reference pattern generating unit 11, instep ST5044 similarly defines a start frame sp(J) of the J-th (or last) small section B(J) as T2 obtained in step ST502, i.e. sp(J)=T2, and also defines an end frame ep(J) of the J-th small section B(J) as T, i.e. ep(J)=T.

The initial reference pattern generating unit 11 then advances to step ST505 in which it defines start and end frames s(j) and e(j) of each of remaining each small sections B(j) (j=2, 3, ..., J−1), from the second small section to the (J−1)-th small section, according to the following equations (19) to (21):

$$L2 = [(T2 - T1 + 3)/(J - 2)] \qquad (19)$$

$$sp(j) = T1 - 1 + (j - 2) * L2 \qquad (20)$$

$$ep(j) = \begin{cases} sp(j) + L2 - 1 + K2 & \text{for } j = 2, \ldots, J - 2 \\ T2 + 1 & \text{for } j = J - 1 \end{cases} \qquad (21)$$

where [ ] of the equation (19) is an arithmetic operation to round off the number in the square brackets to generate an integer, and K2 of the equation (21) is an overlapped parameter for controlling the number of overlapped frames included in each small section B(j) FIG. 9 shows an example in which the number T of frames or feature vectors X(1), X(2), X(3), ..., X(T) is 15, the number J of small sections B(1), B(2), B(3), ..., B(J) or states of the reference pattern is 5, and the overlap parameter K2 is 2.

The initial reference pattern generating unit 11 then advances to step ST506 in which it averages part of the time series 4 of feature vectors included in each small section B(j) obtained in steps ST503 to ST505 according to the following equation (22) to generate an initial value Rp(j) (j=1, 2, 3, ..., J):

$$Rp(j) = \frac{1}{ep(j) - sp(j) + 1} \sum_{k=sp(j)}^{ep(j)} X(k) \qquad (22)$$

In this way, the initial reference pattern generating unit 11 completes the process of generating the initial reference pattern 12.

The reference pattern generating unit 7 receives the initial reference pattern including the plurality of initial values Rp(1), Rp(2), Rp(3), ..., Rp(J) produced by the initial reference pattern generating unit 11 and the time series 4 of feature vectors X(1), X(2), X(3), ..., X(T), which are calculated from the input voice signal by the analysis unit 3. The reference pattern generating unit 7 then generates a reference pattern including a plurality of states each of which is designated by R(j) (j=1, 2, 3, ..., J). In this embodiment, the reference pattern generating unit 7 copies each state of the initial reference pattern Rp(j) (j=1, 2, 3, ..., J), instead of R1(j) (j=1, 2, 3, ..., J) as explained in Embodiment 1, into a corresponding state of an intermediate reference pattern R(c)(j) (j=1, 2, 3, ..., J) according to the above-mentioned equation (17), where c is the value of a learning number counter (not shown). After that, the reference pattern generating unit 7 performs the reference pattern generating process following the same procedure as explained in Embodiment 1 to repeatedly update each state of the intermediate reference pattern R(c)(j) (j=1, 2, 3, ..., J) and then furnishes each updated state of the intermediate reference pattern R(c)(j) (j=1, 2, 3, ..., J) as each state of the reference pattern R(j) (j=1, 2, 3, ..., J) and stops the reference pattern generating procedure when the value c of the learning number counter (not shown) reaches a predetermined threshold value CC.

Figure 10:
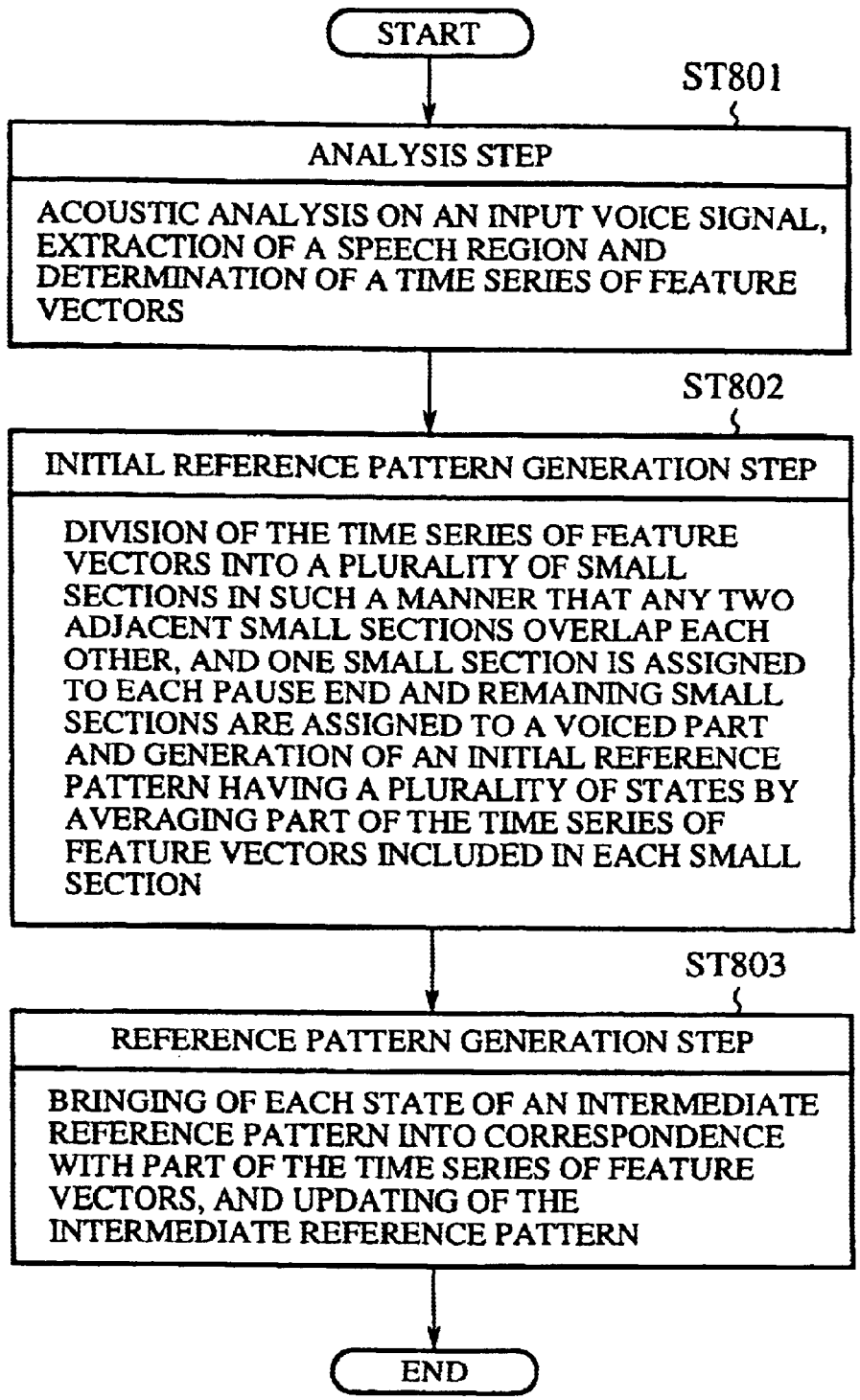
FIG. 10 is a flow diagram showing a reference pattern generating method according to the second embodiment of the present invention.

Next, a concrete description will be made as to a method of generating a reference pattern which the above-mentioned reference pattern generating apparatus employs. FIG. 10 is a flow diagram showing a procedure for implementing the reference pattern generating method according to the second embodiment of the present invention.

When a voice signal generated from a person's voice is applied to the input terminal 1 to create a reference pattern, the analysis unit 3 starts an analyzing process of step ST801 as shown in FIG. 10. In the analyzing step, the analysis unit 3 analog-to-digital converts the voice signal 2 applied to the input terminal 1 and then performs an acoustic analysis on the analog-to-digital converted voice signal on a per-frame basis. Based on the frame-based acoustic analysis result, the analysis unit 3 extracts a speech region from the digital voice signal and then calculates a time series 4 of feature vectors X(1), X(2), X(3), . . . , X(T) on a per-frame basis. Since it is difficult to precisely extract the speech region from the digital voice signal, a few leading and last frames can include a pause. Each feature vector X(t) can be an LPC cepstrum obtained with linear prediction or LPC analysis. In the analysis step, the analysis unit 3 also calculates a time series of voice signal powers P(1), P(2), P(3), . . . , P(T) on a per-frame basis and furnishes the time series of voice signal powers together with the time series 4 of feature vectors X(1), X(2), X(3), . . . , X(T).

Next, the reference pattern generating apparatus advances to a process of generating an initial value of the reference pattern, as shown in step ST802 of FIG. 10. In the initial reference pattern generating step, the initial reference pattern generating unit 11 receives the time series 4 of feature vectors X(1), X(2), X(3), . . . , X(T), which is obtained in the acoustic analysis process, and then generates an initial value 12. The detailed procedure of generating the initial value 12 is as shown in the flow diagram of FIG. 8. An example of the procedure is shown in FIG. 9.

The initial reference pattern generating unit 11, in step ST501, detects a frame in which the corresponding voice signal power P(t) exceeds a threshold value Pth for the first time and defines the frame as T1, by sequentially comparing the time series of voice signal powers P(1), P(2), P(3), . . . , P(T) with the predetermined threshold value Pth in the order in which those powers are running in the forward direction of the time axis, that is, in the order of t=1, 2, 3, . . . , T, as shown in FIG. 9. In the example of FIG. 9, the comparison shows that the voice signal power P(t) at t=3 exceeds the threshold value Pth for the first time, and hence T1=3.

Similarly, the initial reference pattern generating unit 11, in step ST502, detects a frame in which the voice signal power P(t) exceeds the threshold value Pth for the first time and defines the frame as T2, by sequentially comparing the time series of voice signal powers P(1), P(2), P(3), . . . , P(T) with the predetermined threshold value Pth in the order in which those powers are running in the reverse direction of the time axis, that is, in the order of t=T, (T−1), . . . , 2, 1. In the example of FIG. 9, the comparison in the reverse direction of the time axis shows that the voice signal power, P(t) at t=13 exceeds the threshold value Pth for the first time, and hence T2=13.

In order to divide the time series 4 of feature vectors X(1), X(2), X(3), . . . , X(T) into J small sections B(1), B(2), B(3), . . . , B(J), the initial reference pattern generating unit 11 then, in step ST503, defines a start frame sp(1) of the first small section B(1) as 1, i.e. sp(1)=1, and also defines an end frame ep(1)of the small section B(1) as T1, i.e. ep(1)=T1.

Then, the initial reference pattern generating unit 11, in step ST504, similarly defines a start frame sp(J) of the J-th (or last) small section B(J) as T2, i.e. sp(J)=T2, and also defines an end frame ep(J) of the small section B(J) as T, i.e. ep(J)=T.

The initial reference pattern generating unit 11 then, in step ST505, defines start and end frames s(j) and e(j) for each of remaining small sections B(j) (j=2, 3, . . . , J−1), from the second small section to the (J−1)-th small section, according to the equations (19) to (21). The example of FIG. 9 shows the process of dividing the time series 4 in the case that the number T of frames or feature vectors X(1), X(2), X(3), . . . , X(T) is 15, the number J of states of the reference pattern is 5, and the overlap parameter K2 is 2.

The initial reference pattern generating unit 11 then, in step ST506, averages part of the time series 4 of feature vectors included in each small section B(j) obtained in the above steps according to the equation (22) to generate an initial value Rp(j) (j=1, 2, 3, . . . , J). In this way, the initial reference pattern generating unit 11 completes the process of generating the initial reference pattern.

Next, the reference pattern generating apparatus advances to step ST803 of FIG. 10 in which the reference pattern generating unit 7 receives the initial reference pattern including the plurality of states Rp(1), Rp(2), Rp(3), . . . , Rp(J) calculated in the initial reference pattern generating process and the time series 4 of feature vectors X(1), X(2), X(3), . . . , X(T), which are calculated from the input voice signal by the analysis unit 3, to generate a reference pattern including a plurality of states each of which is designated by R(j) (j=1, 2, 3, . . . , J). The reference pattern generating process of the second embodiment differs from that of the first embodiment as shown in step ST703 of FIG. 6 in that the reference pattern generating unit 7 copies each state of the initial reference pattern Rp(j) (j=1, 2, 3, . . . , J), instead of R1(j) (j=1, 2, 3, . . . , J) as explained in Embodiment 1, into a corresponding state of an intermediate reference pattern R(c)(j) (j=1, 2, 3, . . . , J) according to the above-mentioned equation (17).

In order to implement the reference pattern generating method via software, there is a need to provide a computer-readable storage medium for storing a program for making it possible for computers to generate a reference pattern, the program including the steps of performing an acoustic analysis on an input voice signal 2 and calculating a time series 4 of feature vectors X(1), X(2), X(3), . . . , X(T) and a time series of voice signal powers P(1), P(2), P(3), . . . , P(T); dividing the time series 4 of feature vectors into a plurality of small sections B(1), B(2), B(3), . . . , B(J) while making a distinction between two pause ends and a speech-present portion included in the speech region extracted from the input digital voice signal in such a manner that any two adjacent small sections overlap each other and one small section is assigned to each of the two pause ends and remaining small sections are assigned to the speech portion by using the time series of voice signal powers, and averaging a time series of feature vectors included in each small section B(j) to generate each initial value, i.e. each state of the reference pattern Rp(j); and bringing each state of the initial reference pattern Rp(j) (=R(c) (j)) into correspondence with part of the time series 4 of feature vectors X(1), X(2), X(3), . . . , X(T) using a pattern matching method and averaging the part of the time series 4 associated with each state of the intermediate reference pattern R(c)(j) to update each state of the intermediate reference pattern R(c)(j).

As previously mentioned in accordance with the second embodiment of the present invention, the reference pattern generating apparatus divides the time series 4 of feature vectors X(1), X(2), X(3), . . . , X(T) into a sequence of small section B(1) B(2), . . . , B(J) while making a distinction between two pause ends and a speech-present portion include in the speech region extracted from the imput digital voice signal in such a manner that any two adjacent small sections overlap each other and one small section is assigned to each of the two pause ends and remaining small sections are assigned to the speech portion, by using the time series 4 of voice signal powers, by means of the initial reference pattern generating unit 11, and then averages part of the time series 4 of feature vectors included in each small section B(j) to generate an initial value Rp(j) for each small section, by means of the initial reference pattern generating unit 11. According, the second embodiment offers an advantage of preventing the occurrence of a mixture of a speech part and a pause part within a small section, which can make the reference pattern converge to an undesirable local minimum value. In other words, the second embodiment makes it possible for the reference pattern to converge to a more desirable local minimum value.

Embodiment 3

Figure 11:
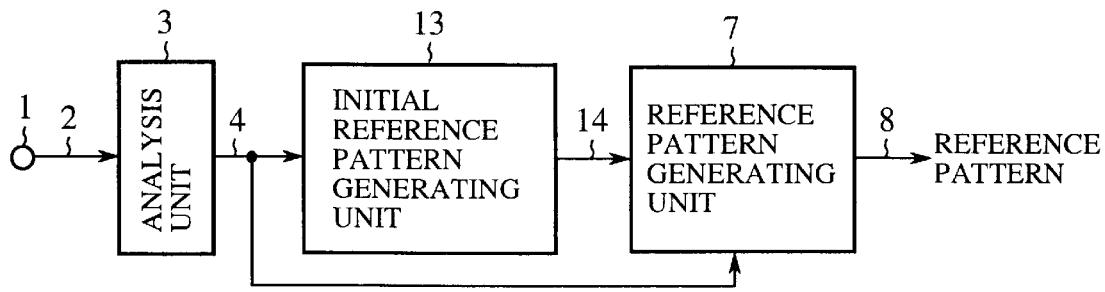
FIG. 11 is a block diagram showing the structure of a reference pattern generating apparatus according to a third embodiment of the present invention.

Referring next to FIG. 11, there is illustrated a block diagram showing the structure of a reference pattern generating apparatus according to a third embodiment of the present invention. In the figure, the same components as those of the reference pattern generating apparatus of the first embodiment are designated by the same reference numerals as shown in FIG. 1, and therefore the description of those components will be omitted hereinafter. In FIG. 11, reference numeral 13 denotes an initial reference pattern generating unit for extracting a predetermined number of feature vectors each of which exhibits a larger change against the immediately preceding feature vector from a time series 4 of feature vectors transmitted from an analysis unit 3, and for dividing the time series 4 of feature vectors into a plurality of small sections in such a manner that any two adjacent small sections overlap each other and a plurality of overlapped portions formed in the sequence of small sections include the predetermined number of extracted feature vectors, respectively. The initial reference pattern generating unit 13 averages part of the time series 4 of feature vectors included in each of the plurality of small sections to generate an initial value 14 of a reference pattern.

Thus the reference pattern generating apparatus according to the third embodiment differs from those of the first and second embodiments in that the initial reference pattern generating unit 13 extracts a predetermined number of feature vectors each of which exhibits a larger change against the immediately preceding feature vector from the time series 4 of feature vectors transmitted from the analysis unit 3, and then divides the time series 4 of feature vectors into a plurality of small sections in such a manner that any two, adjacent small sections overlap each other and a plurality of overlapped portions formed in the sequence of small sections include the predetermined number of extracted feature vectors, respectively.

In operation, a voice signal generated from a person's voice is applied to an input terminal 1 to create a reference pattern. The analysis unit 3 analog-to-digital converts the voice signal 2 applied to the input terminal 1 and then performs an acoustic analysis on the analog-to-digital converted voice signal on a per-frame basis (each certain short time interval is called a "frame"). Based on the acoustic analysis result, the analysis unit 3 extracts a speech region from the digital voice signal and then calculates a time series 4 of feature vectors X(1), X(2), X(3), ..., X(T) on a per-frame basis from the speech region. T is the number of frames included in the speech region extracted from the digital voice signal. Since it is difficult to precisely extract the speech region from the digital voice signal, a few leading and last frames can include a pause. Each feature vector X(t) can be an LPC cepstrum obtained with linear prediction or LPC analysis.

Figure 12:
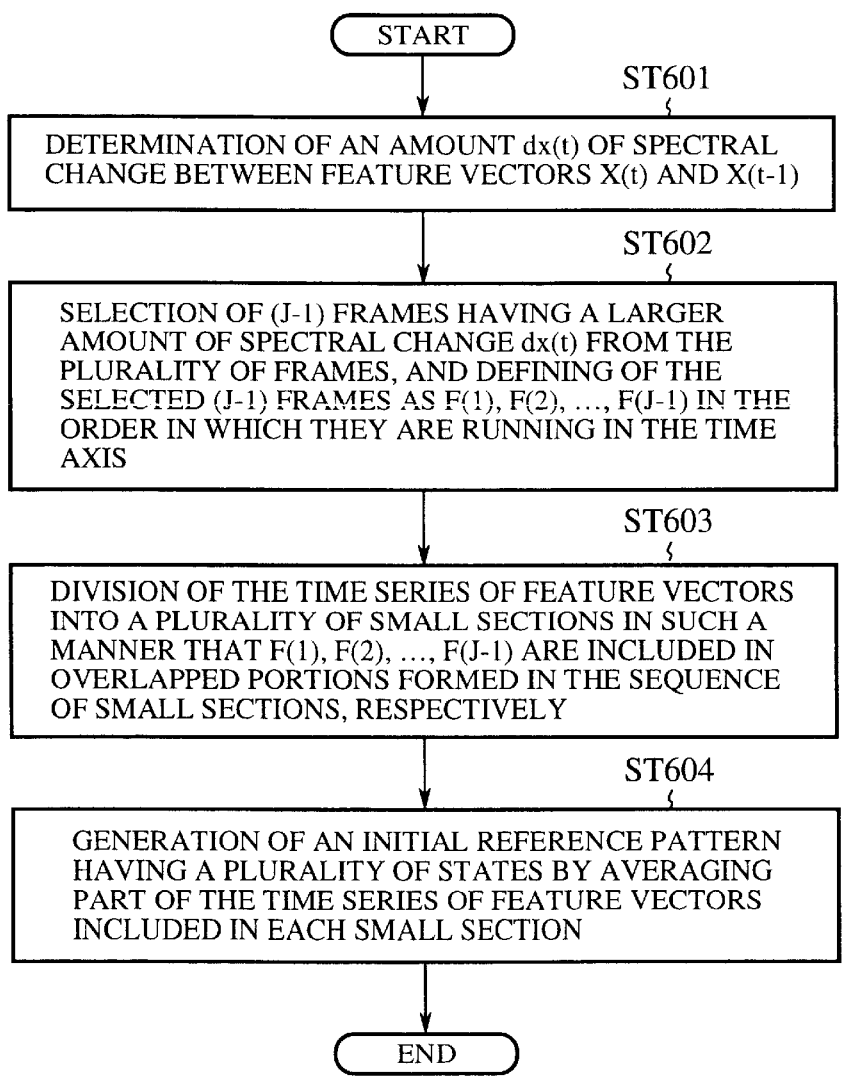
FIG. 12 is a flow diagram showing a procedure of generating an initial reference pattern performed by an initial reference pattern generating unit of the reference pattern generating apparatus of the third embodiment.
Figure 13:
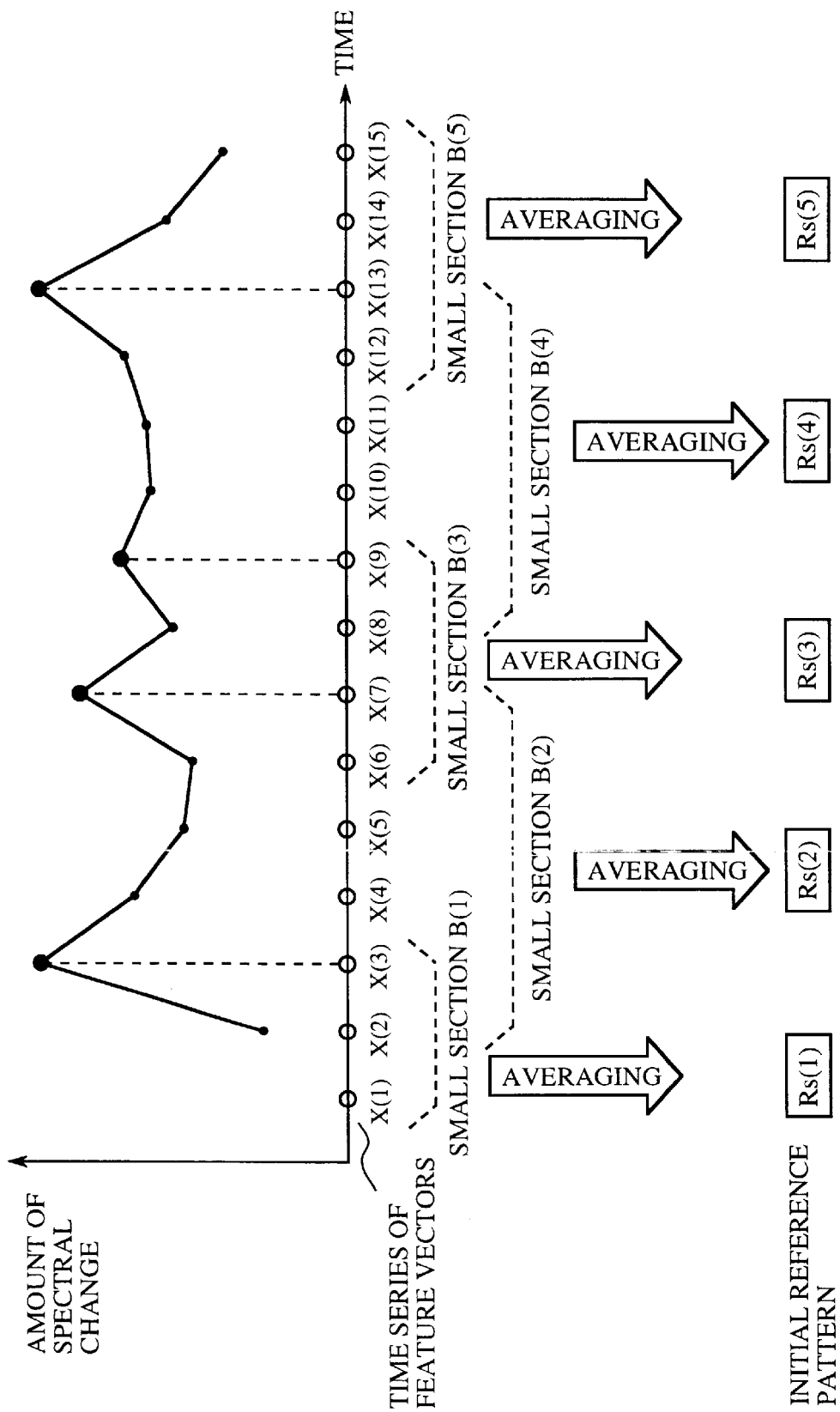
FIG. 13 is a diagram showing an example of the initial reference pattern generating procedure of FIG. 12.

The initial reference pattern generating unit 13 receives the time series 4 of feature vectors X(1), X(2), X(3), ..., X(T) from the analysis unit 3, and then generates an initial value 14 of the reference pattern following a procedure, which will be mentioned later. Referring next to FIG. 12, there is illustrated a flow diagram showing the procedure of generating the initial reference pattern 14. FIG. 13 shows an example of the initial reference pattern generating procedure.

The initial reference pattern generating unit 13, in step ST601 of FIG. 12, calculates the amount of spectral change dX(t) between feature vectors X(t) and X(t−1) for each of all but the first frame t (=2, 3, ..., T) according to the following equation (23):

$$dx(t) = |X(t) - X(t-1)|^2 \text{ where } t = 2, 3, \ldots, T \quad (23)$$

Then the initial reference pattern generating unit 13 advances to step ST602 in which it selects (J−1) frames showing a larger amount of spectral change dx(t) given by the equation (23) from the plurality of frames and then defines the selected (J−1) frames as F(1), F(2), ..., F(J−1) in the order in which they are running in the time axis, where J is the number of small sections into which the time series of feature vectors is to be divided, as shown in FIG. 13. In FIG. 13, the vertical axis shows the amount of spectral change dx(t), and the horizontal axis shows the time series 4 of feature vectors X(1), X(2), X(3), ..., X(T). FIG. 13 shows the case where J=5 and the numbers of the selected four frames having a larger amount of spectral change are 3, 7, 9, and 13 and hence F(1)=3, F(2)=7, F(3)=9, and F(4)=13.

The initial reference pattern generating unit 13 then advances to step ST603 in which it defines start and end frames ss(j) and es(j) of each of the plurality of small sections B(j) (j=1, 3, ..., J) into which the time series 4 of feature vectors X(1), X(2), X(3), ..., X(T) is divided according to the following equations (24) and (25):

$$ss(j) = \begin{cases} 1 & \text{for } j = 1 \\ F(j-1) - K3 & \text{for } j = 2, \ldots, J \end{cases} \quad (24)$$

$$es(j) = \begin{cases} F(j) & \text{for } j = 2, J-2 \\ T & \text{for } j = J \end{cases} \quad (25)$$

where K3 of the equation (24) is an overlap parameter for controlling the number of overlapped frames included in each small section B(j). In the example of FIG. 13, the number T of frames or feature vectors X(1), X(2), X(3), ..., X(T) is 15, the number J of small sections B(1), B(2), B(3), ..., B(J) or states of the reference pattern is 5, and the overlap parameter K3 is 1.

The initial reference pattern generating unit 13 then advances to step ST604 in which it averages part of the time series 4 of feature vectors included in each small section B(j) obtained in step ST603 according to the following equation (26) to generate an initial value Rs(j) (j=1, 2, 3, ..., J):

$$Rs(j) = \frac{1}{es(j) - ss(j) + 1} \sum_{k=ss(j)}^{es(j)} X(k) \quad (26)$$

In this way, the initial reference pattern generating unit 13 completes the process of generating the initial reference pattern 14.

The reference pattern generating unit 7 receives the initial reference pattern including the plurality of states Rs(1), Rs(2), Rs(3), ..., Rs(J) from the initial reference pattern generating unit 13 and the time series 4 of feature vectors X(1), X(2), X(3), ..., X(T), which are calculated from the input voice signal by the analysis unit 3. The reference pattern generating unit 7 then generates a reference pattern including a plurality of states each of which is designated by R(j) (j=1, 2, 3, ..., J). In this embodiment, the reference pattern generating unit 7 copies each state of the initial reference pattern Rs(j) (j=1, 2, 3, ..., J), instead of R1(j) (j=1, 2, 3, ..., J) as explained in Embodiment 1 or Rp(j) (j=1, 2, 3, ..., J) as explained in Embodiment 2, into a corresponding state of an intermediate reference pattern R(c)(j) (j=1, 2, 3, ..., J) according to the above-mentioned equation (17), where c is the value of a learning number counter (not shown). After that, the reference pattern generating unit 7 performs the reference pattern generating process following the same procedure as explained in Embodiment 1 or 2 to repeatedly update each state of the intermediate reference pattern R(c)(j) (j=1, 2, 3, ..., J) and then furnishes each updated state of the intermediate reference pattern R(c)(j) (j=1, 2, 3, ..., J) as each state of the reference pattern R(j) (j=1, 2, 3, ..., J) and stops the reference pattern generating procedure when the value c of the learning number counter (not shown) reaches a predetermined threshold value CC.

Figure 14:
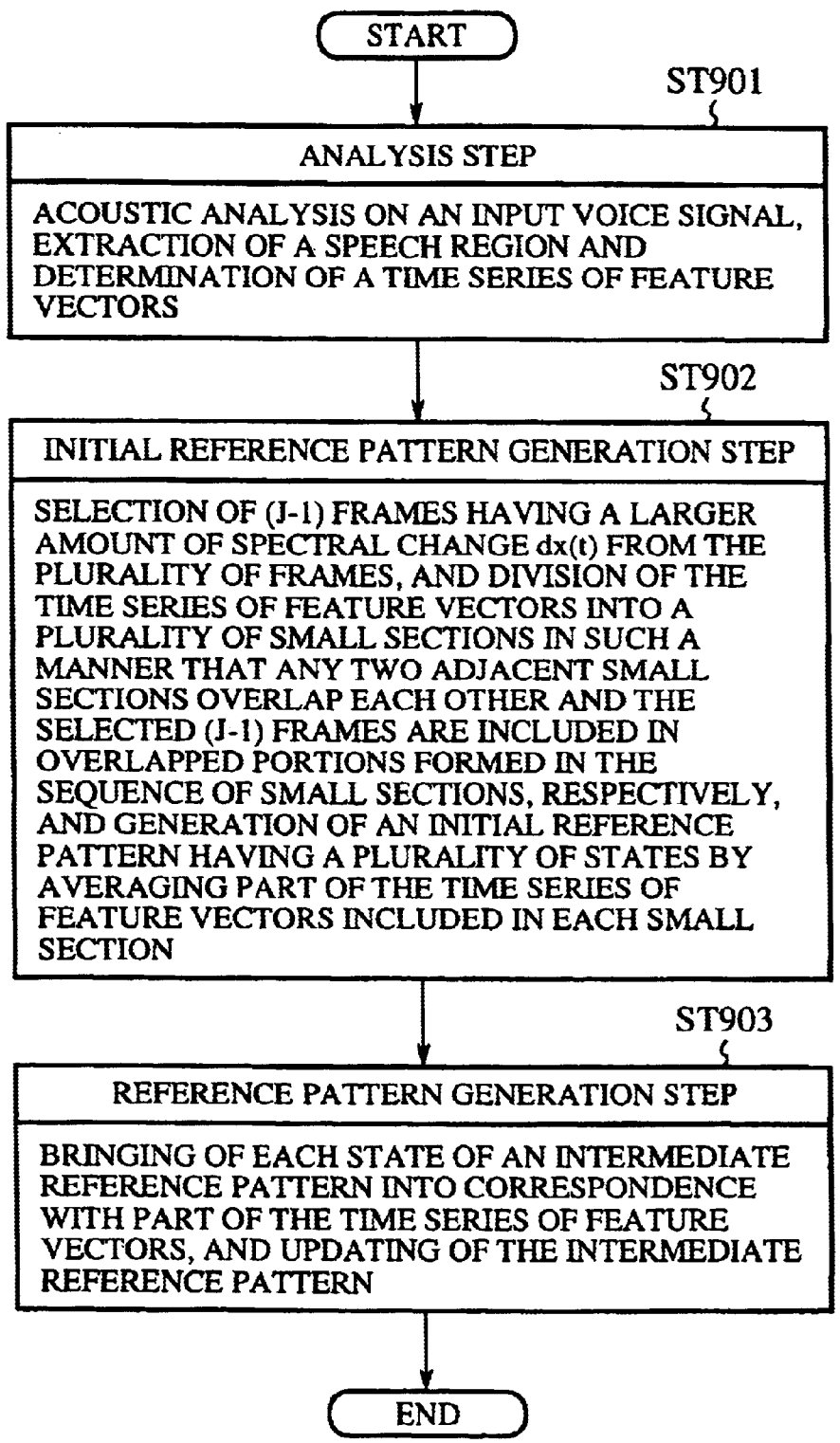
FIG. 14 is a flow diagram showing a reference pattern generating method according to the third embodiment of the present invention.

Next, a concrete description will be made as to a method of generating a reference pattern which the above-mentioned reference pattern generating apparatus employs. FIG. 14 is a flow diagram showing a procedure for implementing the reference pattern generating method according to the third embodiment of the present invention.

When a voice signal generated from a person's voice is applied to the input terminal 1 to create a reference pattern, the analysis unit 3 starts an analyzing process of step ST901 as shown in FIG. 14. In the analyzing step, the analysis unit 3 analog-to-digital converts the voice signal 2 applied to the input terminal 1 and then performs an acoustic analysis on the analog-to-digital converted voice signal on a per-frame basis. Based on the frame-based acoustic analysis result, the analysis unit 3 extracts a speech region from the digital voice signal and then calculates a time series 4 of feature vectors X(1), X(2), X(3), ..., X(T) on a per-frame basis. Since it is difficult to precisely extract the speech region from the digital voice signal, a few leading and last frames can include a pause. Each feature vector X(t) can be an LPC cepstrum obtained with linear prediction or LPC analysis.

Next, the reference pattern generating apparatus advances to a process of generating an initial value of the reference pattern, as shown in step ST902 of FIG. 14. In the initial value generating step, the initial reference pattern generating unit 13 receives the time series 4 of feature vectors X(1), X(2), X(3), ..., X(T), which is obtained in the acoustic analysis process, and then generates an initial reference pattern 14. The detailed procedure of generating the initial reference pattern 14 is shown in the flow diagram of FIG. 12. An example of the initial reference pattern generating procedure is shown in FIG. 13.

The initial reference pattern generating unit 13, in step ST601, calculates the amount of spectral change dx(t) between feature vectors X(t) and X(t−1) for each of all but the first frame t (=2, 3, ..., T) according to the equation (23). The initial reference pattern generating unit 13 then, in step ST602, selects (J−1) frames showing a larger amount of spectral change dx(t) given by the equation (23) from the plurality of frames and then defines the selected (J−1) frames as F(1), F(2), ..., F(J−1) in the order in which they are running in the time axis, where J is the number of small sections into which the time series of feature vectors is to be divided. FIG. 13 shows the case where J=5 and the numbers of the selected four frames having a larger amount of spectral change are 3, 7, 9, and 13 and hence F(1)=3, F(2)=7, F(3)=9, and F(4)=13.

After that, the initial reference pattern generating unit 13, in step ST603, defines start and end frames ss(j) and es(j) of each small section B(j) (j=1, 3, ..., J) according to the equations (24) and (25). The example of FIG. 13 shows the process of dividing the time series 4 in the case that the number T of frames or feature vectors X(1), X(2), X(3), ..., X(T) is 15, the number J of states of the reference pattern is 5, and the overlap parameter K3 is 1.

The initial reference pattern generating unit 13 then, in step ST604, averages part of the time series 4 of feature vectors included in each small section B(j) obtained in the above steps, according to the equation (26) to generate an initial value Rs(j) (j=1, 2, 3, ..., J). In this way, the initial reference pattern generating unit 13 completes the process of generating the initial reference pattern.

Next, the reference pattern generating apparatus advances to step ST903 of FIG. 14 in which the reference pattern generating unit 7 receives the initial reference pattern including the plurality of states Rs(1), Rs(2), Rs(3), ..., Rs(J) calculated in the initial reference pattern generating process and the time series 4 of feature vectors X(1), X(2), X(3), ..., X(T), which are calculated from the input voice signal by the analysis unit 3, to generate a reference pattern including a plurality of states each of which is designated by R(j) (j=1, 2, 3, ..., J). The reference pattern generating process of the third embodiment differs from those of the first and second embodiments as shown in step ST703 of FIG. 6 and step ST803 of FIG. 10 in that the reference pattern generating unit 7 copies each state of the initial reference pattern Rs(j) (j=1, 2, 3, ..., J), instead of R1(j) (j=1, 2, 3, ..., J) as explained in Embodiment 1 or Rp(j) (j=1, 2, 3, ..., J) as explained in Embodiment 2, into a corresponding state of an intermediate reference pattern R(c)(j) (j=1, 2, 3, ..., J) according to the above-mentioned equation (17).

In order to implement the reference pattern generating method via software, there is a need to provide a computer-readable storage medium for storing a program for making it possible for computers to generate a reference pattern, the program including the steps of performing an acoustic analysis on an input voice signal 2 and calculating a time series 4 of feature vectors X(1), X(2), X(3), ..., X(T): selecting (J−1) frames, i.e. feature vectors, exhibiting a larger amount of change against the immediately preceding feature vector from the time series 4 of feature vectors; dividing the time series 4 of feature vectors into a sequence of small sections B(1), B(2), B(3), ..., B(J) in such a manner that any two adjacent small sections overlap each other and (J−1) overlapped portions formed in the sequence of small sections include the selected (J−1) feature vectors, respectively, and averaging part of the time series of feature vectors included in each small section B(j) to generate an initial value Rs(j) for each small section; bringing each of the plurality of states or initial values Rs(j) (=R(c)(j)) into correspondence with part of the time series 4 of feature vectors X(1), X(2), ..., X(T) using a pattern matching method and averaging the part of the time series 4 associated with each state of the intermediate reference pattern R(c)(j) to update each state of the intermediate reference pattern R(c.)(j).

As previously mentioned, in accordance with the third embodiment of the present invention, the reference pattern generating apparatus divides the time series 4 of feature vectors X(1), X(2), X(3), ..., X(T) into a sequence of small sections B(1), B(2), ..., B(J), while selecting a predetermined number of frames having a larger amount of spectral change and defining them as the boundaries of the plurality of small sections, and then averages part of the time series 4 of feature vectors included in each small section B(j) to generate an initial value Rs(j) for each small section, by means of the initial reference pattern generating unit 13. Accordingly, the third embodiment offers an advantage of decreasing a possibility that the reference pattern converge to an undesirable local minimum value because of a mixture of feature vectors having different spectra in the same small section. In other words, the third embodiment makes it possible for the reference pattern to converge to a more desirable local minimum value.

Embodiment 4

Figure 15:
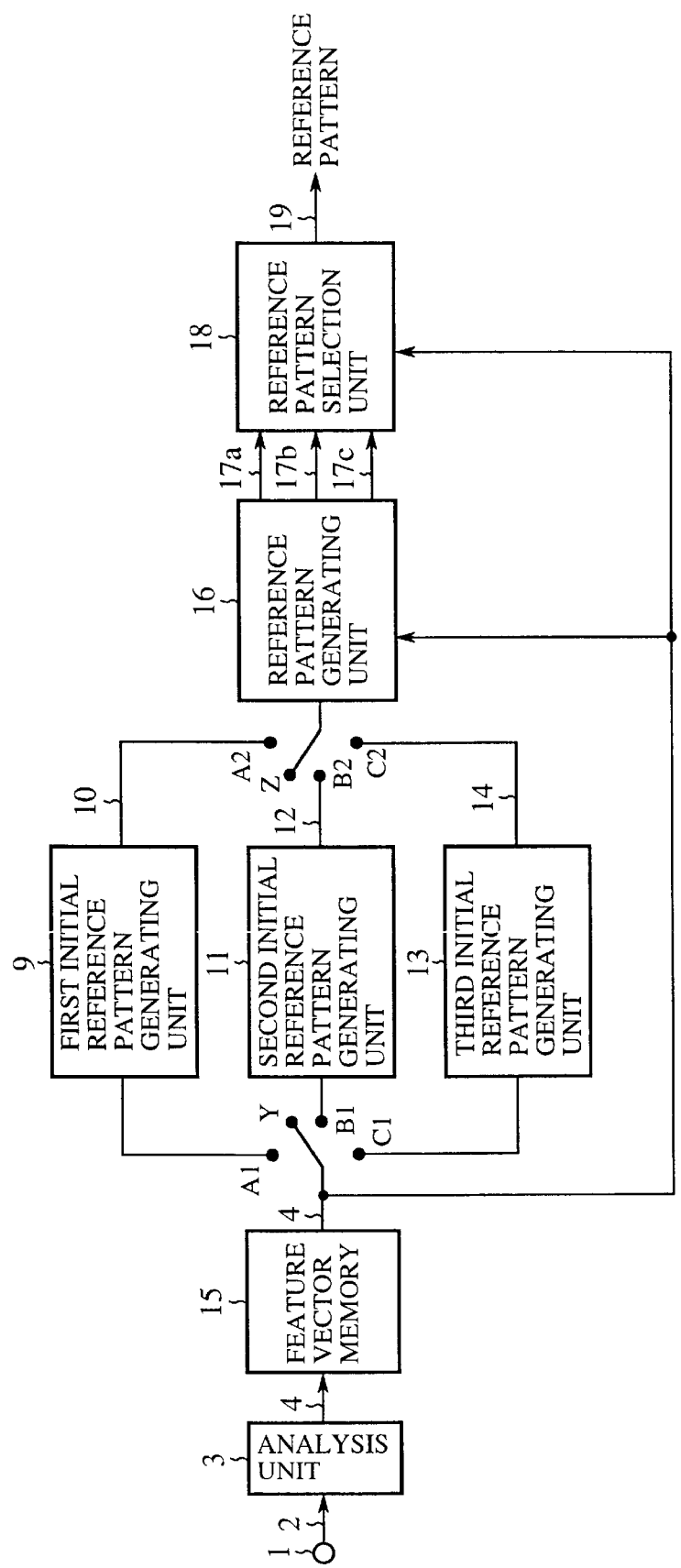
FIG. 15 is a block diagram showing the structure of a reference pattern generating apparatus according to a fourth embodiment of the present invention.

Referring next to FIG. 15, there is illustrated a block diagram showing the structure of a reference pattern generating apparatus according to a fourth embodiment of the present invention. In the figure, the same components as those of the reference pattern generating apparatuses of the first through third embodiments are designated by the same reference numerals as shown in FIGS. 1, 7, and 11, and therefore the description of those components will be omitted hereinafter. In FIG. 15, reference numeral 15 denotes a feature vector memory for storing a time series 4 of feature vectors which is an acoustic analysis result from an analysis unit 3 which has performed an acoustic analysis on an input voice signal 2, and a time series of voice signal powers, and numeral 16 denotes a reference pattern generating unit for generating first, second, and third reference patterns 17a, 17b, and 17c based on first, second, and third initial values 10, 12, and 14 of a reference pattern, which are generated by first, second, and third initial reference pattern generating units 9, 11, and 13, respectively, and numeral 18 denotes a reference pattern selection unit for performing a pattern matching between the first through third reference patterns 17a, 17b, and 17c generated by the reference pattern generating unit 16 and the time series 4 of feature vectors read out of the feature vector memory 15 and for selecting one reference pattern showing a minimum pattern matching distance from the three reference patterns to furnish the selected reference pattern as a final reference pattern.

Thus the reference pattern generating apparatus according to the fourth embodiment differs from those of the first through third embodiments in that it is provided with the first through third initial reference pattern generating units 9, 11, and 13 according to the first through third embodiments mentioned above, and performs a pattern matching between first through third reference patterns generated from the first through third initial reference patterns produced by those initial reference pattern generating units and the time series 4 of feature vectors and then selects one reference pattern showing a minimum pattern matching distance from the three reference patterns to furnish the selected reference pattern as a final reference pattern.

In operation, a voice signal generated from a person's voice is applied to an input terminal 1 to create a reference pattern. The analysis unit 3 analog-to-digital converts the voice signal 2 applied to the input terminal 1 and then performs an acoustic analysis on the analog-to-digital converted voice signal on a per-frame basis (each certain short time interval is called a "frame") Based on the acoustic analysis result, the analysis unit 3 extracts a speech region from the digital voice signal and then calculates a time series 4 of feature vectors X(1), X(2), X(3), . . . , X(T) on a per-frame basis from the speech region. The analysis unit 3 also calculates a time series of powers of the voice signal within the speech region on a per-frame basis: P(1), P(2), P(3), . . . , P(T), and then furnishes the time series of voice signal powers together with the time series 4 of feature vectors X(1), X(2), X(3), . . . , X(T). Since it is difficult to precisely extract the speech region from the digital voice signal, a few leading and last frames can include a pause. Each feature vector X(t) can be an LPC cepstrum obtained with linear prediction or LPC analysis.

Both the time series 4 of feature vectors X(1), X(2), X(3), . . . , X(T) obtained by the analysis unit 3 and the time series of voice signal powers P(1), P(2), P(3), . . . , P(T) are transferred and stored into the feature vector memory 15. An output terminal Y of the feature vector memory 15 is then connected to an input terminal A1 of the first initial reference pattern generating unit 9, and an input terminal Z of the reference pattern generating unit 16 is connected to an output terminal A2 of the first initial reference pattern generating unit 9. The feature vector memory 15 then furnishes the time series 4 of feature vectors X(1), X(2), X(3), . . . , X(T) to the first initial reference pattern generating unit 9. The first initial reference pattern generating unit 9 generates a first initial reference pattern 10 from the input information following the same procedure as previously!mentioned in Embodiment 1. The reference pattern generating unit 16 then generates a first reference pattern 17a based on the first initial reference pattern 10 generated by the first initial reference pattern generating unit 9 following the same procedure as previously mentioned in Embodiment 1, and furnishes the first reference pattern 17a to the reference pattern selection unit 18.

Next, the output terminal Y of the feature vector memory 15 is connected to an input terminal B1 of the second initial reference pattern generating unit 11, and the input terminal Z of the reference pattern generating unit 16 is connected to an output terminal B2 of the second initial reference pattern generating unit 11. The feature vector memory 15 then furnishes both the time series 4 of feature vectors X(1), X(2), X(3), . . . , X(T) and the time series of voice signal powers P(1), P(2), P(3), . . . , P(T) to the second initial reference pattern generating unit 11. The second initial reference pattern generating unit 11 generates a second initial reference pattern 12 from the input information following the same procedure as previously mentioned in Embodiment 2. The reference pattern generating unit 16 then generates a second reference pattern 17b based on the second initial reference pattern 12 generated by the second initial reference pattern generating unit 11 following the same procedure as previously mentioned in Embodiment 2, and furnishes the second reference pattern 17b to the reference pattern selection unit 18.

The output terminal Y of the feature vector memory 15 is then connected to an input terminal C1 of the third initial reference pattern generating unit 13, and the input terminal Z of the reference pattern generating unit 16 is connected to an output terminal C2 of the third initial reference pattern generating unit 13. The feature vector memory 15 then furnishes the time series 4 of feature vectors X(1), X(2), X(3), . . . , X(T) to the third initial reference pattern generating unit 13. The third initial reference pattern generating unit 13 generates a third initial reference pattern 14 from the input information following the same procedure as previously mentioned in Embodiment 3. The reference pattern generating unit 16 then generates a third reference pattern 17c based on the third initial reference pattern 14 generated by the third initial reference pattern generating unit 13 following the same procedure as previously mentioned in Embodiment 3, and furnishes the third reference pattern 17c to the reference pattern selection unit 18.

The reference pattern selection unit 18 receives the time series 4 of feature vectors X(1), X(2), X(3), . . . , X(T) from the feature vector memory 15, the first reference pattern 17a generated on the basis of the first reference pattern 10, the second reference pattern 17b generated on the basis of the second reference pattern 12, and the third reference pattern 17c generated on the basis of the third reference pattern 14. The reference pattern selection unit 18 then calculates three pattern matching distances between the first through third reference patterns 17a, 17b, and 17c and the time series 4 of feature vectors X(1), X(2), X(3), . . . , X(T) using the Viterbi algorithm as explained in Embodiment 1. The reference pattern selection unit 18 selects one reference pattern exhibiting a minimum pattern matching distance from the three pattern matching distances calculated and then furnishes the selected reference pattern as a final reference pattern 19.

Figure 16:
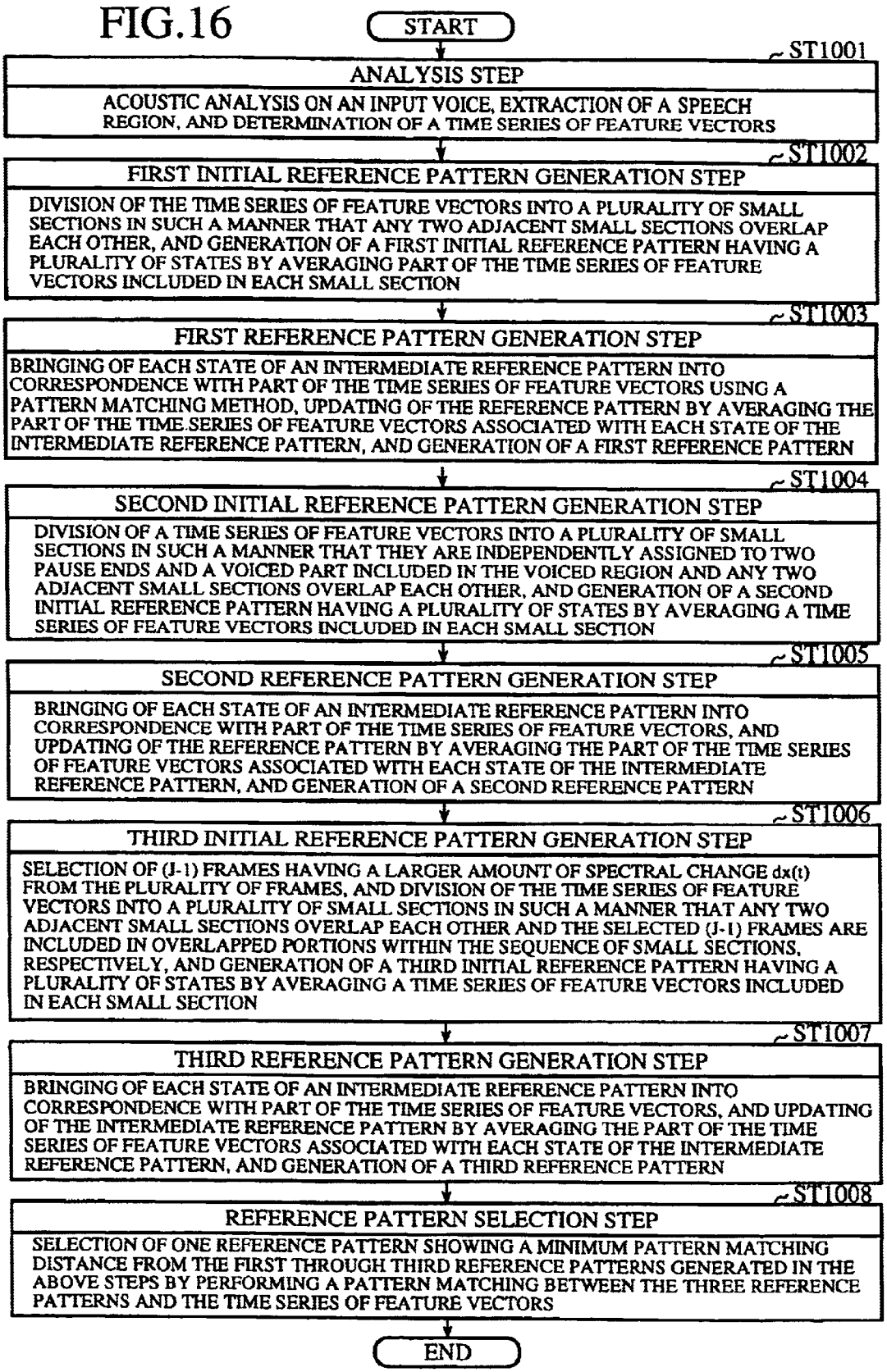
FIG. 16 is a flow diagram showing a reference pattern generating method according to the fourth embodiment of the present invention.
Figure 17:
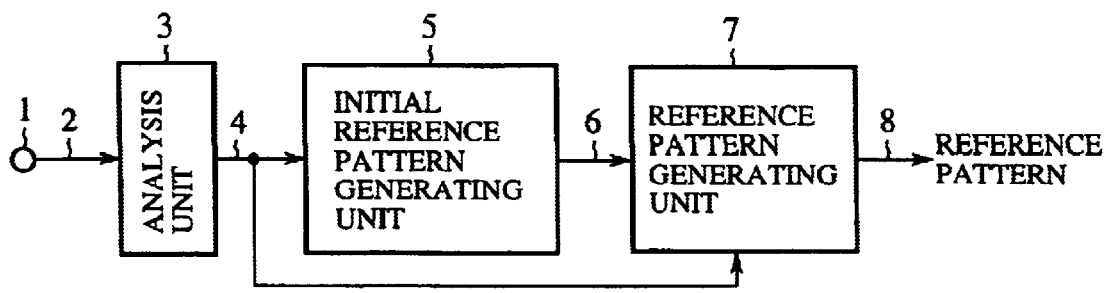
FIG. 17 is a block diagram showing the structure of a conventional reference pattern generating apparatus.
Figure 18:
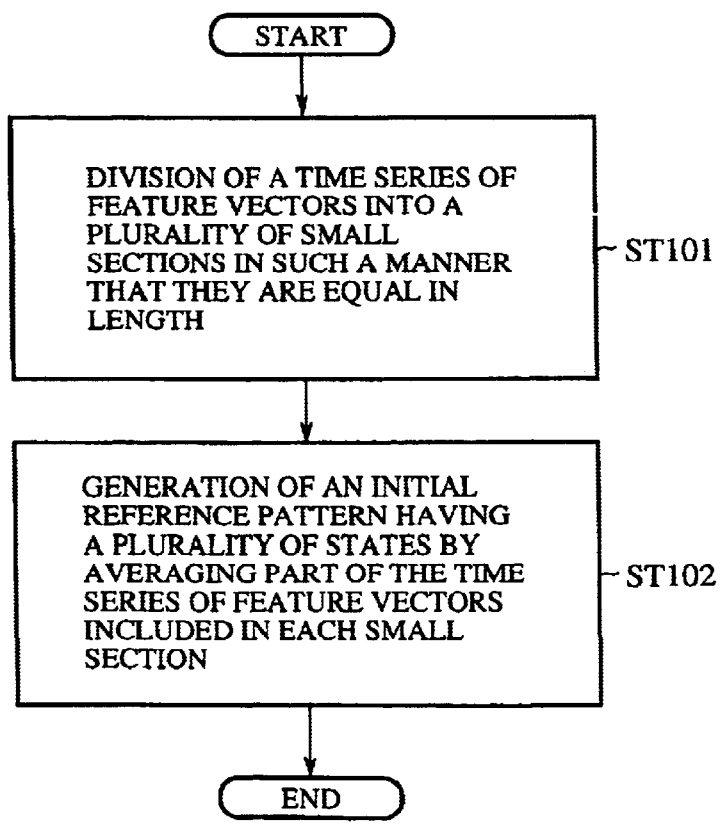
FIG. 18 is a flow diagram showing a procedure of generating an initial reference pattern performed by an initial reference pattern generating unit of the conventional reference pattern generating apparatus.
Figure 19:
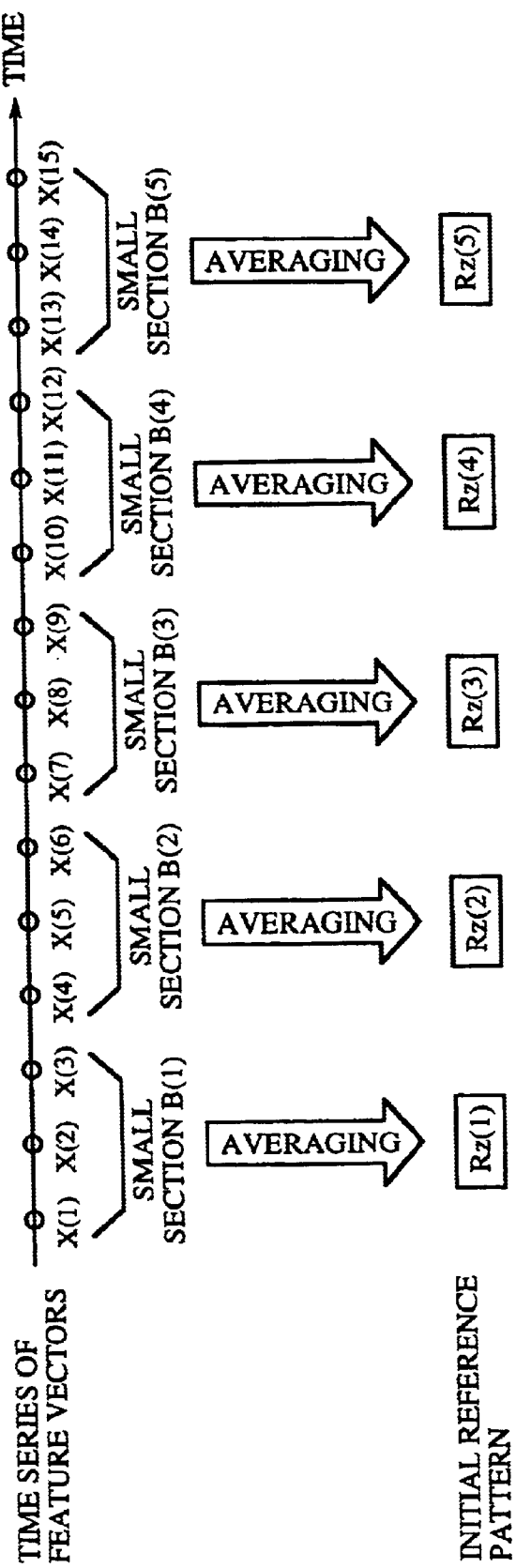
FIG. 19 is a diagram showing an example of the initial reference pattern generating procedure of FIG. 18.
Figure 20:
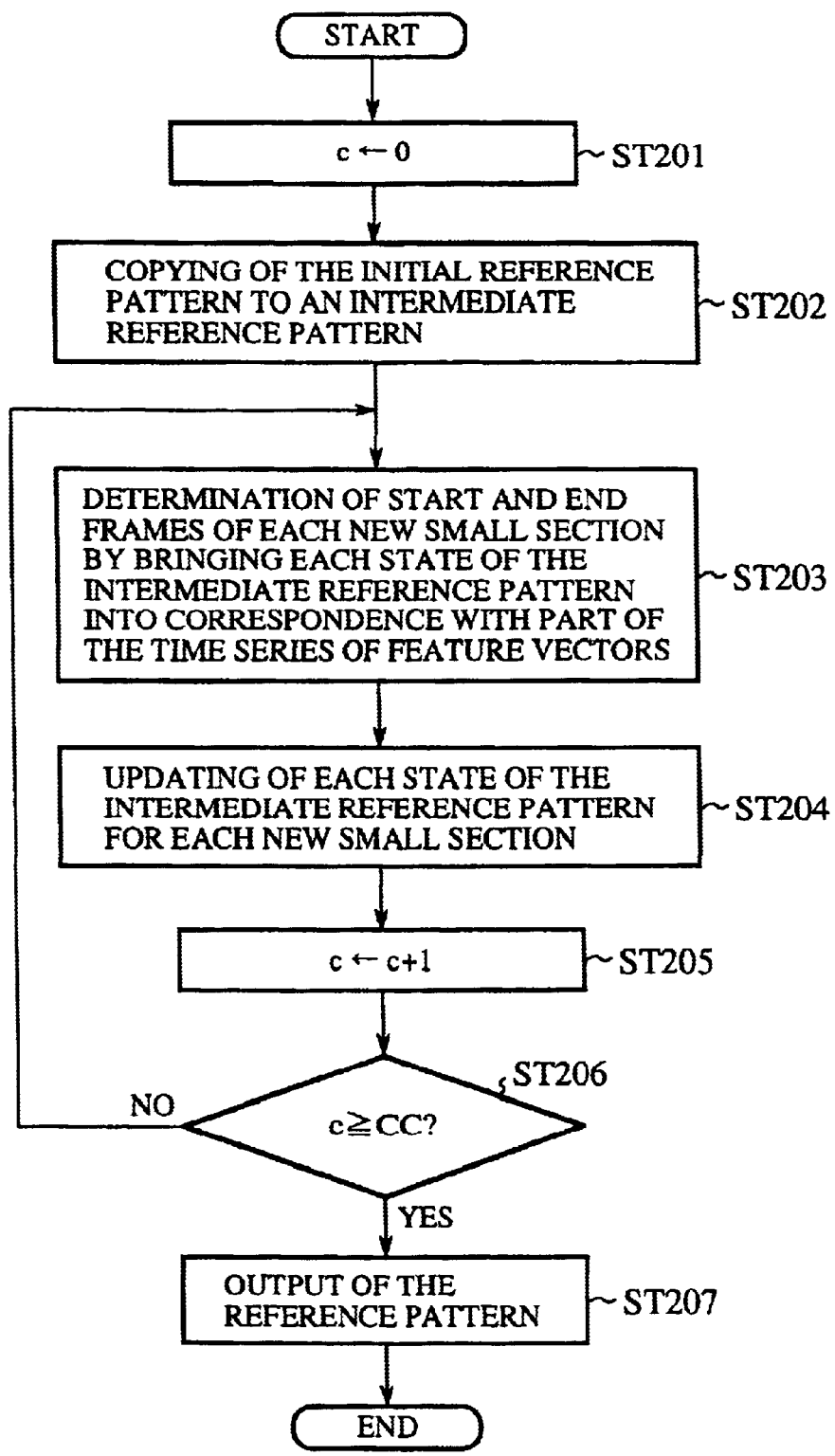
FIG. 20 is a flow diagram showing a procedure of generating a reference pattern performed by a reference pattern generating unit of the conventional reference pattern generating apparatus.

Next, a concrete description will be made as to a method of generating a reference pattern which the above-mentioned reference pattern generating apparatus employs. FIG. 16 is a flow diagram showing a procedure for implementing the reference pattern generating method according to the fourth embodiment of the present invention.

When a voice signal generated from a person's voice is applied to the input terminal 1 to create a reference pattern, the analysis unit 3 starts an analyzing process of step ST1001 as shown in FIG. 16. In the analyzing step, the analysis unit 3 analog-to-digital converts the voice signal 2 applied to the input terminal 1 and then performs an acoustic analysis on the analog-to-digital converted voice signal on a per-frame basis. Based on the frame-based acoustic analysis result, the analysis unit 3 extracts a speech region from the digital voice signal and then calculates a time series 4 of feature vectors X(1), X(2), X(3), . . . , X(T) on a per-frame basis. In the analysis step, the analysis unit 3 also calculates a time series of voice signal powers P(1), P(2), P(3), . . . , P(T) on a per-frame basis and furnishes the time series of voice signal powers together with the time series 4 of feature vectors X(1), X(2), X(3), . . . , X(T). Since it is difficult to precisely extract the speech region from the digital voice signal, a few leading and last frames can include a pause. Each feature vector X(t) can be an LPC cepstrum obtained with linear prediction or LPC analysis.

The reference pattern generating apparatus then advances to step ST1002 of FIG. 16 in which it connects the output terminal Y of the feature vector memory 15 to the input terminal A1 of the first initial reference pattern generating unit 9, and also connects the input terminal Z of the reference pattern generating unit 16 to the output terminal A2 of the first initial reference pattern generating unit 9, the feature vector memory 15 then furnishes the time series 4 of feature vectors X(1), X(2), X(3), . . . , X(T) to the first initial reference pattern generating unit 9, and the first initial reference pattern generating unit 9 generates a first initial reference pattern 10 from the input information following the same procedure as previously mentioned in Embodiment 1. The reference pattern generating unit 16 then, in step ST1003 of FIG. 16, generates a first reference pattern 17a based on the first initial reference pattern 10 generated by the first initial reference pattern generating unit 9 following the same procedure as previously mentioned in Embodiment 1, and furnishes the first reference pattern 17a to the reference pattern selection unit 18.

Next, the reference pattern generating apparatus advances to step ST1004 of FIG. 16 in which it connects the output terminal Y of the feature vector memory 15 to the input terminal B1 of the second initial reference pattern generating unit 11, and also connects the input terminal Z of the reference pattern generating unit 16 to the output terminal B2 of the second initial reference pattern generating unit 11, the feature vector memory 15 then furnishes both the time series 4 of feature vectors X(1), X(2), X(3), . . . , X(T) and the time series of voice signal powers P(1), P(2), P(3), . . . , P(T) to the second initial reference pattern generating unit 11, and the second initial reference pattern generating unit 11 generates a second initial reference pattern 12 from the input information following the same procedure as previously mentioned in Embodiment 2. The reference pattern generating unit 16 then, in step ST1005 of FIG. 16, generates a second reference pattern 17b based on the second initial reference pattern 12 generated by the second initial reference pattern generating unit 11 following the same procedure as previously mentioned in Embodiment 2, and furnishes the second reference pattern 17b to the reference pattern selection unit 18.

The reference pattern generating apparatus then advances to step ST1006 of FIG. 16 in which it connects the output terminal Y of the feature vector memory, 15 to the input terminal C1 of the third initial reference pattern generating unit 13, and also connects the input terminal Z of the reference pattern generating unit 16 to the output terminal C2 of the third initial reference pattern generating unit 13, the feature vector memory 15 then furnishes the time series 4 of feature vectors X(1), X(2), X(3), . . . , X(T) to the third initial reference pattern generating unit 13, and the third initial reference pattern generating unit 13 generates a third initial reference pattern 14 from the input information following the same procedure as previously mentioned in Embodiment 3. The reference pattern generating unit 16 then, in step ST1007 of FIG. 16, generates a third reference pattern 17c based on the third initial reference pattern 14 generated by the third initial reference pattern generating unit 13 following the same procedure as previously mentioned in Embodiment 3, and furnishes the third reference pattern 17c to the reference pattern selection unit 18.

After that, the reference pattern selection unit 18, in step ST1008 of FIG. 16, receives the time series 4 of feature vectors X(1), X(2), X(3), . . . , X(T) from the feature vector memory 15, the first reference pattern 17a generated on the basis of the first reference pattern 10, the second reference pattern 17b generated on the basis of the second reference pattern 12, and the third reference pattern 17c generated on the basis of the third reference pattern 14. The reference pattern selection unit 18 then calculate three pattern matching distance between the first through third reference patterns 17a, 17b, and 17c and the time series 4 of feature vectors X(1), X(2), X(3), . . . , X(T) using the Viterbi algorithm as explained in Embodiment 1. The reference pattern selection unit 18 selects one reference pattern exhibiting a minimum pattern matching distance from the three pattern matching distances calculated and then furnishes the selected reference pattern as a final reference pattern 19.

In order to implement the reference pattern generating method via software, there is a need to provide a computer-readable storage medium for storing a program for making it possible for computers to generate a reference pattern, the program including the steps of performing an acoustic analysis on an input voice signal 2 and calculating a time series 4 of feature vectors X(1), X(2), X(3), . . . , X(T) and a time series of voice signal powers P(1), P(2), P(3), . . . , P(T); dividing the time series 4 of feature vectors into a plurality of small sections B(1), B(2), B(3), . . . , B(J) in such a manner that any two adjacent small sections overlap each other, averaging a time series of feature vectors included in each small section B(j) to generate each state of a first initial reference pattern 10 for each small section, and generating a first reference pattern 17a from the first initial reference pattern 10; dividing the time series 4 of feature vectors into a plurality of small sections B(1), B(2), B(3), ..., B(J) while making a distinction between two pause ends and a speech-present portion included in a speech region extracted from an input digital voice signal in such a manner that any two adjacent small sections overlap each other and one small section is assigned to each of the two pause ends and remaining small sections are assigned to the speech portion, by using the time series of voice signal powers, averaging a time series of feature vectors included in each small section B(j) to generate each state of a second initial reference pattern 12 for each small section, and generating a second reference pattern 17b from the second initial reference pattern 12; selecting (J−1) feature vectors, exhibiting a larger amount of change against the immediately preceding feature vector from the time series 4 of feature vectors, dividing the time series 4 of feature vectors into a sequence of small sections B(1), B(2), B(3), ..., B(J) in such a manner that any two adjacent small sections overlap each other and (J−1) overlapped portions formed in the sequence of small sections include the selected (J−1) feature vectors, respectively, averaging part of the time series of feature vectors included in each small section B(j) to generate each state of a third initial reference pattern 14 for each small section, and generating a third reference pattern 17c from the third initial reference pattern 14; and performing a pattern matching between the first through third reference patterns 17a, 17b, and 17c and the time series 4 of feature vectors, and selecting one reference pattern showing a minimum pattern matching distance from the three reference patterns to furnish the selected reference pattern as a final reference pattern 19.

As previously mentioned, in accordance with the fourth embodiment of the present invention, the reference pattern generating apparatus selects one reference pattern showing a minimum pattern matching distance from the first reference pattern 17a generated on the basis of the first reference pattern 10, the second reference pattern 17b generated on the basis of the second reference pattern 12, and the third reference pattern 17c generated on the basis of the third reference pattern 14 to furnish the selected reference pattern as a final reference pattern 19. Accordingly, the present embodiment offers an advantage of being able to provide a reference pattern having high representation efficiency Many widely different embodiments of the present invention may be constructed without departing from the spirit and scope of the present invention. It should be understood that the present invention is not limited to the specific embodiments described in the specification, except as defined in the appended claims.

What is claimed is:

1. A reference pattern generating apparatus, comprising:
    initial reference pattern generating means for dividing a time series of feature vectors obtained from a voice signal into a sequence of small sections in such a manner that any two adjacent small sections overlap each other, and for averaging part of the time series of feature vectors included in each of the plurality of small sections so as to generate an initial reference pattern having a plurality of states respectively associated with the plurality of small sections; and
    reference pattern generating means for bringing each of the plurality of states of the initial reference pattern into correspondence with part of the time series of feature vectors using pattern matching, and for averaging the part of the time series of feature vectors brought into correspondence with each of the plurality of states of the initial reference pattern so as to update the initial reference pattern to generate a reference pattern.

2. The reference pattern generating apparatus according to claim 1, wherein said initial reference pattern generating means divides the time series of feature vectors into the sequence of small sections in such a manner that the plurality of small sections are equal in length where possible, otherwise all but one end small section are equal in length.

3. The reference pattern generating apparatus according to claim 1, wherein said initial reference pattern generating means divides the time series of feature vectors into the sequence of small sections while making a distinction between pause portions and a speech portion included in the voice signal in such a manner that one small section is assigned to each of the pause portions and remaining small sections are assigned to the speech portion.

4. The reference pattern generating apparatus according to claim 1, wherein said initial reference pattern generating means selects a predetermined number of feature vectors exhibiting a larger amount of change against an immediately preceding feature vector from the time series of feature vectors, the number of feature vectors selected being equal to a number of overlapped portions formed in the sequence of small sections, and then divides the time series of feature vectors into the sequence of small sections in such a manner that the plurality of overlapped portions include the predetermined number of feature vectors selected, respectively.

5. The reference pattern generating apparatus according to claim 1, wherein said initial reference pattern generating means includes:
    a first initial value generating means for dividing the time series of feature vectors into a sequence of small sections in such a manner that any two adjacent small sections overlap each other and the plurality of small sections are equal in length where possible, otherwise all but one end small section are equal in length, and for averaging part of the time series of feature vectors included in each of the plurality of small sections so as to generate a first initial reference pattern;
    a second initial value generating means for dividing the time series of feature vectors into a sequence of small sections while making a distinction between pause portions and a speech portion included in the voice signal in such a manner that any two adjacent small sections overlap each other, and one small section is assigned to each of the pause portions and remaining small sections are assigned to the speech portion, and for averaging part of the time series of feature vectors included in each of the plurality of small sections so as to generate a second initial reference pattern; and
    third initial value generating means for selecting a predetermined number of feature vectors having a larger amount of change against an immediately preceding feature vector from the time series of feature vectors, for dividing the time series of feature vectors into a sequence of small sections in such a manner that any two adjacent small sections overlap each other and the plurality of overlapped portions include the predetermined number of feature vectors selected, respectively, the predetermined number of feature vectors selected being equal to a number of overlapped portions formed in the sequence of small sections, and for averaging part of the time series of feature vectors included in each of the plurality of small sections so as to generate a third initial reference pattern, and wherein said reference pattern generating means generates three reference patterns from the first through third initial reference patterns generated by said first through third initial value generating means, and said apparatus further comprises a reference pattern selecting means for performing pattern matching between each of the three reference patterns generated by said first through third initial value generating means and the time series of feature vectors and for selecting one reference pattern showing a minimum pattern matching distance from the three reference patterns.

6. A reference pattern generating method of compressing a time series of feature vectors obtained from a voice signal and generating a reference pattern, said method comprising the steps of:

dividing the time series of feature vectors into a sequence of small sections in such a manner that any two adjacent small sections overlap each other;

averaging part of the time series of feature vectors included in each of the plurality of small sections so as to generate an initial reference pattern having a plurality of states associated with the plurality of small sections; and generating a reference pattern by bringing each of the plurality of states of the initial reference pattern into correspondence with part of the time series of feature vectors using pattern matching and by averaging the part of the time series of feature vectors brought into correspondence with each of the plurality of states of the initial reference pattern so as to update the initial reference pattern to generate a reference pattern.

7. The reference pattern generating method according to claim 6, wherein said dividing step includes dividing the time series of feature vectors into the sequence of small sections in such a manner that the plurality of small sections are equal in length where possible, otherwise all but one end small section are equal in length.

8. The reference pattern generating method according to claim 6, wherein said dividing step includes dividing the time series of feature vectors into the sequence of small sections while making a distinction between pause portions and a speech portion included in the voice signal in such a manner that one small section is assigned to each of the pause portions and remaining small sections are assigned to the speech portion.

9. The reference pattern generating method according to claim 6, wherein said dividing step includes:

selecting a predetermined number of feature vectors having a larger amount of change against an immediately preceding feature vector from the time series of feature vectors, the number of feature vectors selected being equal to a number of overlapped portions formed in the sequence of small sections, and dividing the time series of feature vectors into the sequence of small sections in such a manner that the plurality of overlapped portions include the predetermined number of feature vectors selected, respectively.

10. The reference pattern generating method according to claim 6, wherein said dividing and averaging steps include:

dividing the time series of feature vectors into a sequence of small sections in such manner that any two adjacent small sections overlap each other, and the plurality of small sections are equal in length where possible, otherwise all but one end small section are equal in length, and averaging part of the time series of feature vectors included in each of the plurality of small sections so as to generate a first initial reference pattern;

dividing the time series of feature vectors into a sequence of small sections while making a distinction between pause portions and a speech portion included in the voice signal in such a manner that any two adjacent small sections overlap each other and one small section is assigned to each of the pause portions and remaining small sections are assigned to the speech portion, and averaging part of the time series of feature vectors included in each of the plurality of small sections so as to generate a second initial reference pattern; and selecting a predetermined number of feature vectors having a larger amount of change against an immediately preceding feature vector from the time series of feature vectors, dividing the time series of feature vectors into a sequence of small sections in such a manner that any two adjacent small sections overlap each other and the plurality of overlapped portions include the predetermined number of feature vectors selected, respectively, the number of feature vectors selected being equal to a number of overlapped portions formed in the plurality of small sections, and averaging part of the time series of feature vectors included in each of the plurality of small sections so as to generate a third initial reference pattern, and wherein said reference pattern generating step includes generating three reference patterns;

said method further comprising performing pattern matching between each of the three reference patterns and the time series of feature vectors of and selecting one reference pattern showing a minimum pattern matching distance from the three reference patterns.

11. A computer readable medium having a computer program embodied thereon, the computer program being executable by a machine to the perform the steps of:

dividing the time series of feature vectors obtained from a voice signal into a sequence of small sections in such a manner that any two adjacent small sections overlap each other;

averaging part of the time series of feature vectors included in each of the plurality of small sections so as to generate an initial reference pattern having a plurality of states associated with the plurality of small sections; and generating a reference pattern by bringing each of the plurality of states of the initial reference pattern into correspondence with part of the time series of feature vectors using pattern matching, and by averaging the part of the time series of feature vectors brought into correspondence with each of the plurality of states of the initial reference pattern so as to update the initial reference pattern.

12. The computer readable medium according to claim 11, wherein said dividing step includes dividing the time series of feature vectors into the sequence of small sections in such a manner that the plurality of small sections are equal in length where possible, otherwise all but one end small section are equal in length.

13. The computer readable medium according to claim 11, wherein said dividing step includes dividing the time series of feature vectors into the sequence of small sections while making a distinction between pause portions and a speech portion included in the voice signal in such a manner that one small section is assigned to each of the pause portions and remaining small sections are assigned to the speech portion.

14. The computer readable medium according to claim 11, wherein said dividing step includes:

selecting a predetermined number of feature vectors having a larger amount of change against an immediately preceding feature vector from the time series of feature vectors, the number of feature vectors selected being equal to a number of overlapped portions formed in the sequence of small sections, and dividing the time series of feature vectors into the sequence of small sections in such a manner that the plurality of overlapped portions include the predetermined number of feature vectors selected respectively.

15. The computer readable medium according to claim 11, wherein said dividing and averaging steps include:

dividing the time series of feature vectors into a sequence of small sections in such a manner that any two adjacent small sections overlap each other, and the plurality of small sections are equal in length where possible, otherwise all but one end small section are equal in length, and averaging part of the time series of feature vectors included in each of the plurality of small sections so as to generate a first initial reference pattern;

dividing the time series of feature vectors into a sequence of small sections while making a distinction between pause portions and a speech portion included in the voice signal in such a manner that any two adjacent small sections overlap each other and one small section is assigned to each of the pause portions and remaining small sections are assigned to the speech portion, and averaging part of the time series of feature vectors included in each of the plurality of small sections so as to generate a second initial reference pattern; and selecting a predetermined number of feature vectors having a larger amount of change against an immediately preceding feature vector from the time series of feature vectors, dividing the time series of feature vectors into a sequence of small sections in such a manner that any two adjacent small sections overlap each other and the plurality of overlapped portions include the predetermined number of feature vectors selected, respectively, the number of feature vectors selected being equal to a number of overlapped portions formed in the plurality of small sections, and averaging part of the time series of feature vectors included in each of the plurality of small sections so as to generate a third initial reference pattern, and wherein said reference pattern generating step is the step of generating three reference patterns from the first to third initial reference patterns and said computer program further performs the steps of performing pattern matching between each of the three reference patterns and the time series of feature vectors of and selecting one reference pattern showing a minimum pattern matching distance from the three reference patterns.

* * * * *